United States Patent
Kakimoto

(10) Patent No.: US 10,661,745 B2
(45) Date of Patent: May 26, 2020

(54) HEAD PROTECTION AIRBAG DEVICE

(71) Applicant: TOYODA GOSEI CO., LTD., Kiyosu-shi, Aichi-ken (JP)

(72) Inventor: Kenji Kakimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 90 days.

(21) Appl. No.: 16/124,467

(22) Filed: Sep. 7, 2018

(65) Prior Publication Data

US 2019/0092265 A1 Mar. 28, 2019

(30) Foreign Application Priority Data

Sep. 28, 2017 (JP) ................. 2017-188200

(51) Int. Cl.
| | | |
|---|---|---|
| *B60R 21/215* | (2011.01) | |
| *B60R 21/213* | (2011.01) | |
| *B60R 21/231* | (2011.01) | |
| *B60R 21/232* | (2011.01) | |
| *B60R 21/2334* | (2011.01) | |
| *B60R 21/201* | (2011.01) | |
| *B60R 21/237* | (2006.01) | |
| *B60R 21/00* | (2006.01) | |

(52) U.S. Cl.
CPC .......... *B60R 21/215* (2013.01); *B60R 21/201* (2013.01); *B60R 21/213* (2013.01); *B60R 21/232* (2013.01); *B60R 21/2334* (2013.01); *B60R 21/23138* (2013.01); *B60R 21/237* (2013.01); *B60R 2021/0048* (2013.01)

(58) Field of Classification Search
CPC . B60R 21/215; B60R 21/201; B60R 21/2334; B60R 21/232; B60R 21/23138; B60R 21/213; B60R 2021/0048; B60R 21/237
See application file for complete search history.

(56) References Cited

U.S. PATENT DOCUMENTS

| | | | |
|---|---|---|---|
| 8,820,779 B1* | 9/2014 | Low | B60R 21/232 |
| | | | 280/728.2 |
| 9,573,550 B1* | 2/2017 | Mitchell | B60R 21/213 |
| 2003/0094796 A1* | 5/2003 | Feldman | B60R 21/23184 |
| | | | 280/730.2 |
| 2004/0119270 A1* | 6/2004 | Gu | B60R 21/232 |
| | | | 280/730.2 |

(Continued)

FOREIGN PATENT DOCUMENTS

| | | |
|---|---|---|
| JP | 2012-245854 A | 12/2012 |
| JP | 2015-016764 A | 1/2015 |

*Primary Examiner* — Drew J Brown
(74) *Attorney, Agent, or Firm* — Posz Law Group, PLC

(57) ABSTRACT

A head protection airbag device includes: an airbag formed so as to cover a window of a vehicle; and a case for storing a folded body of the airbag. The airbag has an engaging hole through which an engaging protrusion passes. The case includes the engaging protrusion. A portion constituting a peripheral edge of the engaging hole has recessed sections recessed from an upper edge of the airbag in front of and behind the engaging hole so as to have a tab-shaped portion. In a state in which the airbag is flatly developed, an upper edge of the tab-shaped portion that has the engaging hole is disposed nearly on a same line as an upper edge of a general section of the airbag which is adjacent to the tab-shaped portion.

6 Claims, 21 Drawing Sheets

(56) References Cited

U.S. PATENT DOCUMENTS

| | | | | |
|---|---|---|---|---|
| 2012/0267879 A1* | 10/2012 | Kim | .................... | B60R 21/213 |
| | | | | 280/730.2 |
| 2012/0299276 A1 | 11/2012 | Hayashi et al. | | |
| 2015/0291119 A1* | 10/2015 | Noma | ................... | B60R 21/201 |
| | | | | 280/728.2 |
| 2018/0015901 A1* | 1/2018 | Konaka | ................. | B60R 21/237 |

* cited by examiner

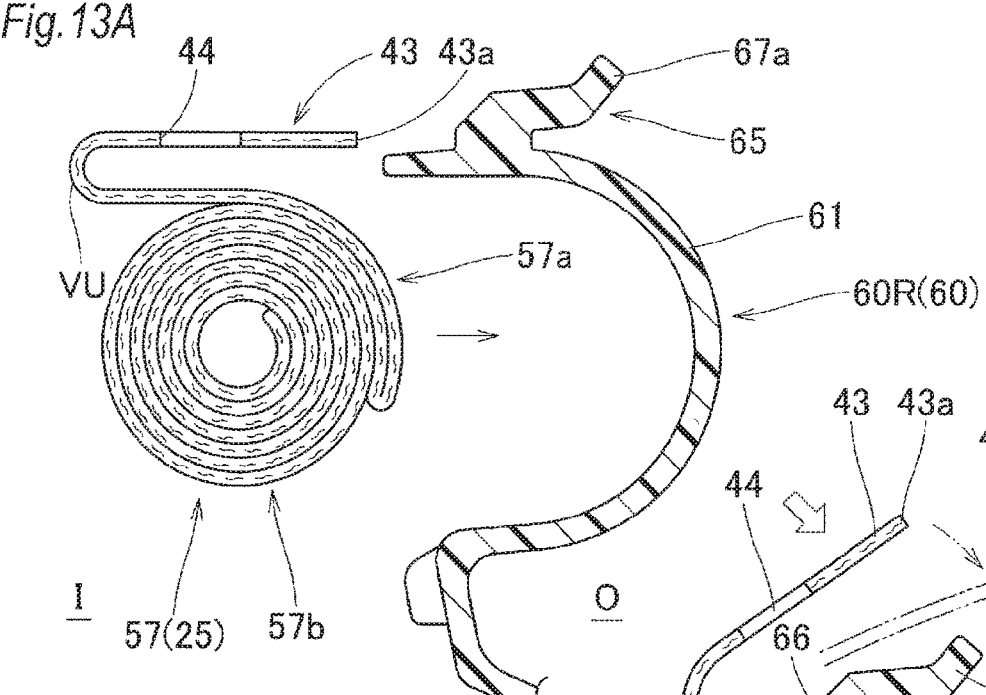
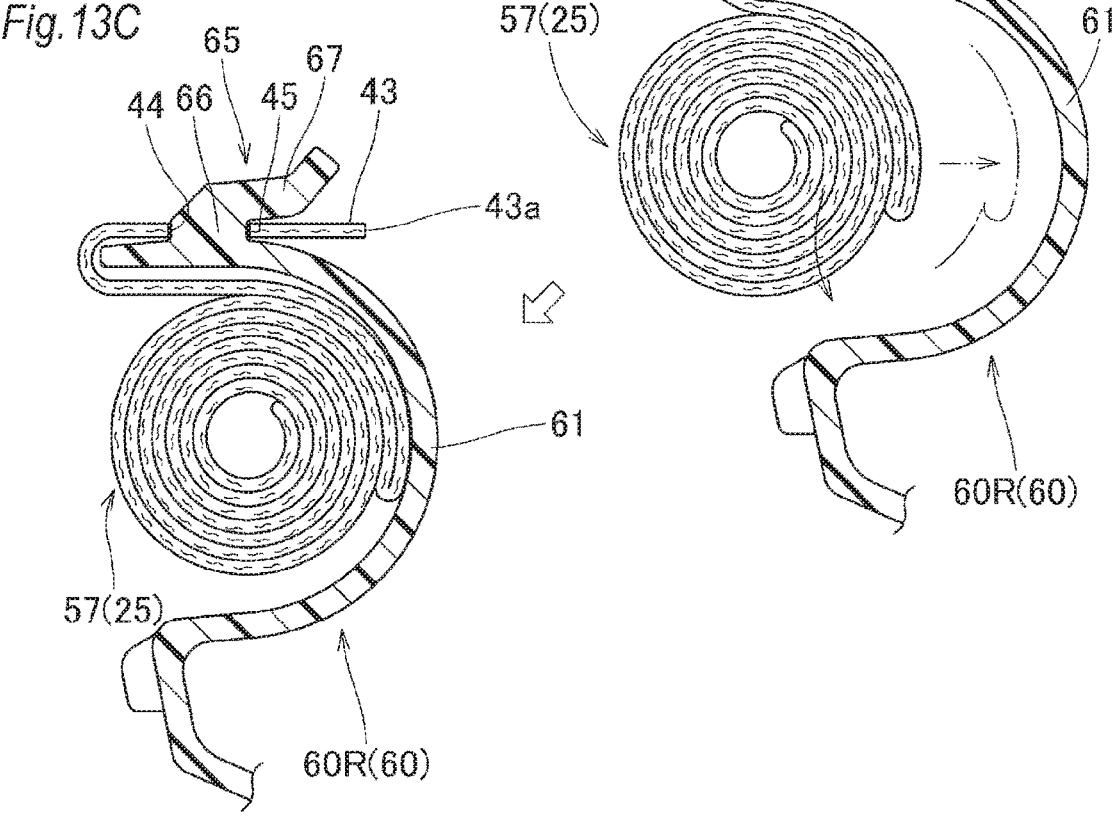

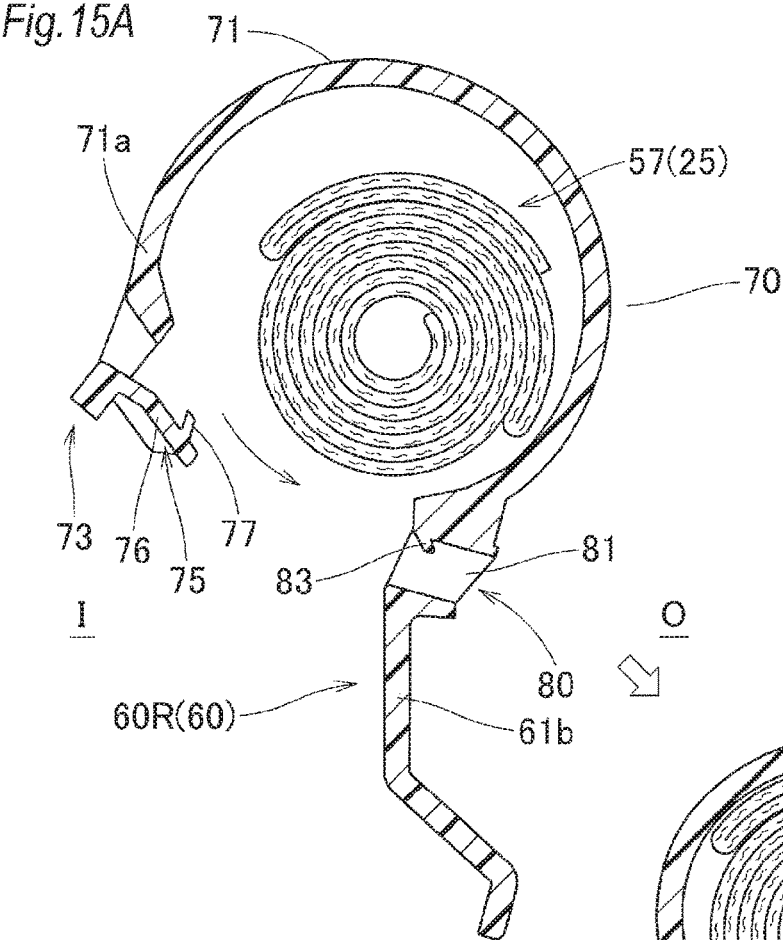
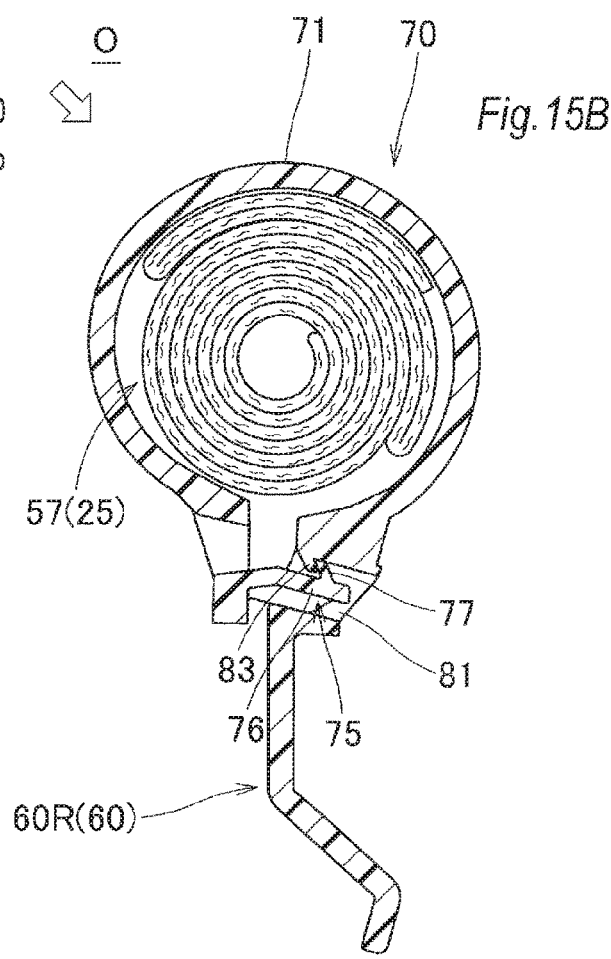

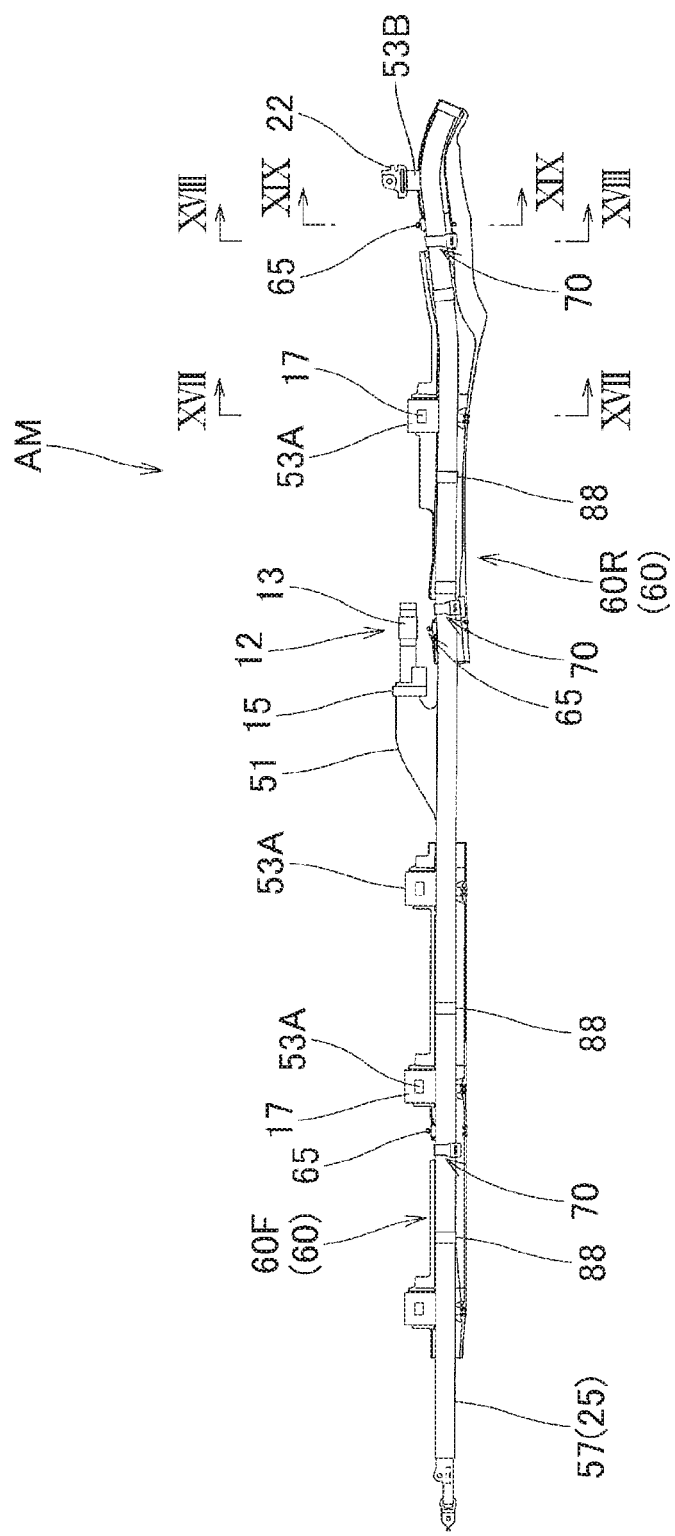

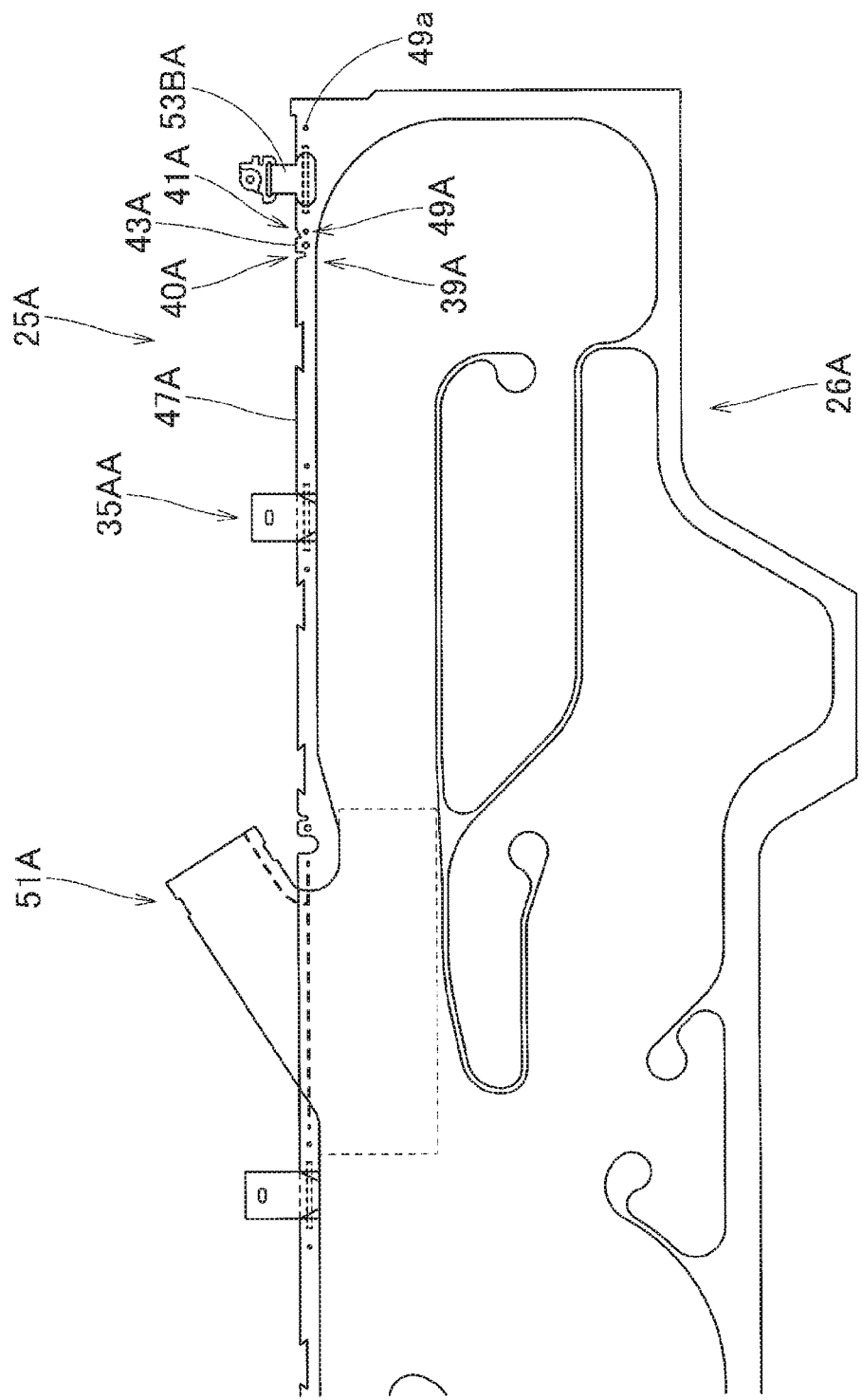

HEAD PROTECTION AIRBAG DEVICE

CROSS-REFERENCE TO RELATED APPLICATION(S)

This application is based upon and claims the benefit of priority from prior Japanese patent application No. 2017-188200, filed on Sep. 28, 2017, the entire contents of which are incorporated herein by reference.

BACKGROUND

1. Technical Field

The present invention relates to a head protection airbag device being configured such that an airbag for covering the windows of a vehicle at the time of development and inflation is folded, stored in a case made of a synthetic resin and mounted on the vehicle.

2. Background Art

As a head protection airbag device configured such that a folded body obtained by folding an airbag is stored in a case and mounted on a vehicle, a head protection airbag device is available in which engaging protrusions disposed so as to protrude outward on the side of the outer peripheral face of the case are inserted into engaging holes formed on the upper edge side of the airbag and engaged with the peripheral edges thereof whereby the folded body of the airbag is accurately stored in the case while suppressing the occurrence of twisting in the folded body (for example, referred to JP-A-2012-245854). In this related-art head protection airbag device, at the positions on the front side and the rear side of each engaging protrusion, slits into which the upper edge side portions of the airbag can be inserted are formed in a row from the end edge, the upper edge side portions of the airbag are inserted into the slits, the areas of the peripheral edges of the engaging holes in the airbag are disposed so as to cover the outer peripheral face side of the case, and the engaging protrusions are inserted into the engaging holes.

Furthermore, as a head protection airbag device configured such that a folded body obtained by folding an airbag is stored in a case and mounted on a vehicle, another head protection airbag device is available in which tabs are formed so as to partially protrude on the upper edge side of the airbag, and the tabs are provided with engaging holes into which engaging protrusions protruding outward on the outer peripheral face side of the case are inserted and engaged (for example, referred to JP-A-2015-16764).

In the head protection airbag device disclosed in JP-A-2012-245854, the upper edge of the airbag is nearly linear. The engaging protrusion protruding outward between the slits is inserted into the engaging hole while the upper edge side portions of the airbag are inserted into the slits formed in the case. Hence, at the upper edge side portions of the airbag, it is difficult to pull the peripheral edge portion of the engaging hole so as to partially separate the peripheral edge portion from the folded body, whereby there is room for improvement in workability for smoothly inserting the engaging protrusion into the engaging hole.

Furthermore, in the head protection airbag device disclosed in JP-A-2015-16764, since the tabs partially protruding on the upper edge side of the airbag are provided and the engaging holes are formed in the tabs, the workability for inserting the engaging protrusions into the engaging holes is satisfactory. However, since the engaging holes are disposed above the upper edge of the airbag, when the folded body is stored in the case and the engaging protrusions are engaged with the engaging holes, it is difficult to visually recognize the position of the upper edge of the airbag exposed on the upper face side of the folded body with respect to the case, whereby there is room for improvement in accurately confirming the presence or absence of twisting (whether twisting is large or small).

The present invention is made to solve the above-mentioned problems and is intended to provide a head protection airbag device in which a folded body obtained by folding the airbag can be easily stored in a case and twisting in the folded body can be accurately regulated.

SUMMARY

According to an aspect of the present invention, there is provided ahead protection airbag device comprising: an airbag which is formed so as to cover a window of a vehicle at a time of development and inflation and so as to be folded and stored on an upper edge side of the window on a vehicle interior side; and a case which is made of a synthetic resin for storing a folded body of the airbag which is folded so that a lower edge side of the airbag at a time of inflation completion is made close to an upper edge side of the airbag, wherein the airbag has an engaging hole on the upper edge side thereof through which an engaging protrusion formed on a side of the case can pass, the case includes the engaging protrusion disposed so as to protrude outward on an outer peripheral face side of an area that covers an upper face side of the folded body, on the upper edge side of the airbag, a portion constituting a peripheral edge of the engaging hole has recessed sections recessed from an upper edge of the airbag in front of and behind the engaging hole so as to have a tab-shaped portion formed into a tab shape so that the upper edge side can be pulled away from the folded body, and in a state in which the airbag is flatly developed, an upper edge of the tab-shaped portion that has the engaging hole is disposed nearly on a same line as an upper edge of a general section of the airbag which is adjacent to the tab-shaped portion.

BRIEF DESCRIPTION OF THE DRAWINGS

FIGS. 13A to 13C are partially enlarged vertical sectional views showing the steps in which the tab-shaped portion of the airbag is engaged with the engaging protrusion of the case at the time when the folded body of the airbag is stored in the case;

FIGS. 15A and 15B are partially enlarged vertical sectional views showing the steps in which the winding band is wound around the folded body;

FIG. 16 is a front view showing an airbag assembly in the head protection airbag device according to the embodiment;

FIG. 21 is a partially enlarged front view showing an airbag according to another embodiment in the head protection airbag device according to the present invention.

DETAILED DESCRIPTION OF EXEMPLARY EMBODIMENTS

Figure 1:
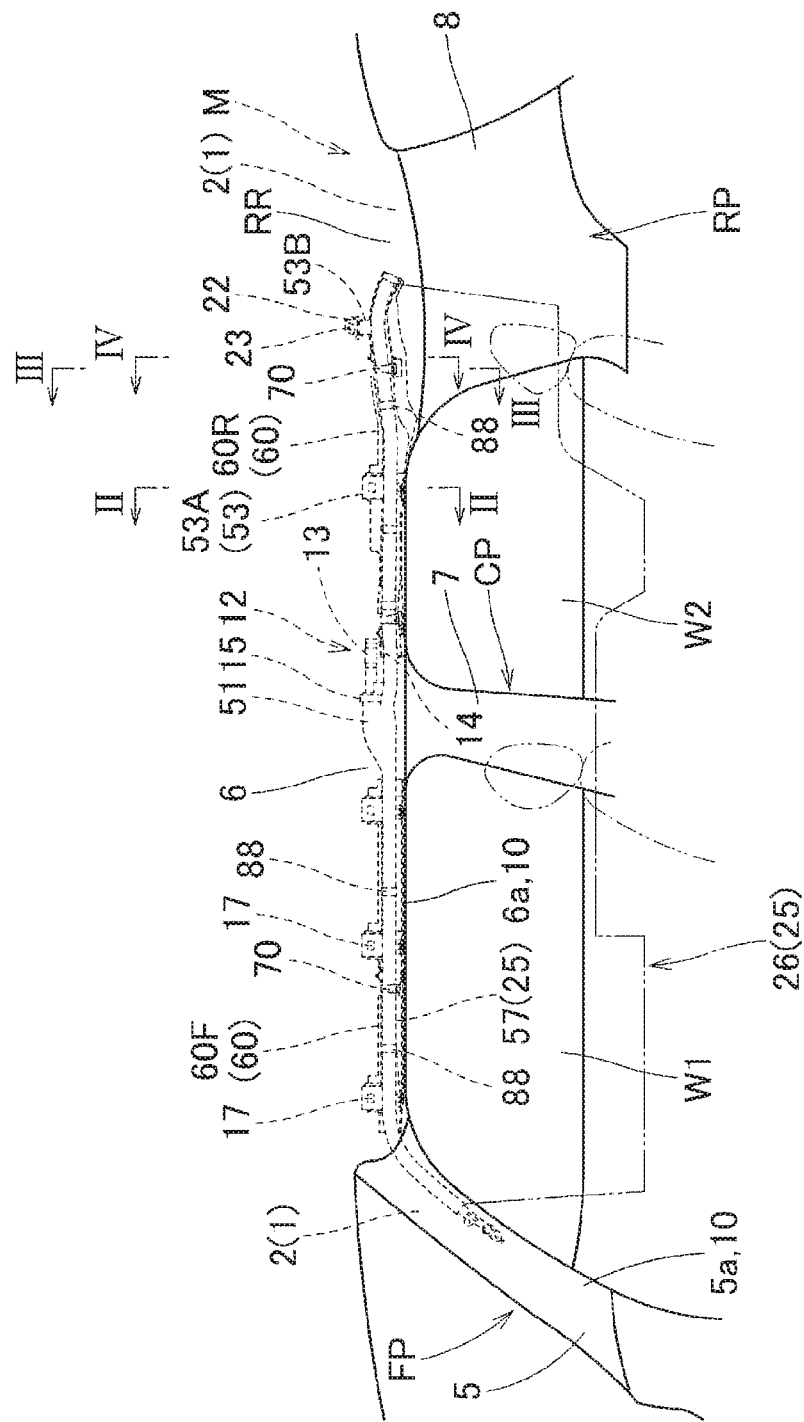
FIG. 1 is a schematic front view showing a head protection airbag device according to an embodiment of the present invention.

An embodiment according to the present invention will be described below on the basis of the accompanying drawings. In a head protection airbag device M according to the embodiment, as shown in FIG. 1, its airbag is folded and stored along the peripheral edges on the upper edge sides of the windows (side windows) W1 and W2 of a vehicle V, that is, in the area ranging from the front pillar section FP to the vicinity of the upper part of the rear pillar section RP via the roof side rail section RR of the vehicle V so as to be able to cover the windows W1 and W2 at the time of inflation completion. In the case of the embodiment, the vehicle V is provided with an intermediate pillar section CP disposed along a nearly up-down direction between the front pillar section FP and the rear pillar section RP, and an airbag 25 is configured so as to cover not only the windows W1 and W2 but also the vehicle interior sides of an intermediate pillar garnish 7 disposed on the intermediate pillar section CP and part of a rear pillar garnish 8 disposed on the rear pillar section RP at the time of inflation completion as indicated by two-dot chain lines in FIG. 1.

In the following descriptions of the embodiment, unless otherwise specified, the up-down and front-rear directions of the airbag device are aligned with the up-down and front-rear directions of the vehicle at the time when the airbag device is mounted on the vehicle.

As shown in FIGS. 1 to 4, the head protection airbag device M is composed of the airbag 25, an inflator 12 for supplying inflation gas to the airbag 25, an installing bracket 13, installing clips 17 and a case 60 for storing the folded airbag 25 (folded body 57). The folded airbag 25 (folded body 57), the inflator 12 and the case 60 are stored such that their vehicle interior sides I are covered with an airbag cover 10 when they are mounted on the vehicle V (see FIGS. 1 to 4). In the case of the embodiment, the airbag cover 10 is composed of the lower edge 5a of the front pillar garnish 5 covering the vehicle interior side of the front pillar section FP and the lower edge 6a of the roof head lining 6 covering the vehicle interior side of the roof side rail section RR.

The front pillar garnish 5 and the roof head lining 6, each made of a synthetic resin, are installed together with the intermediate pillar garnish 7 and the rear pillar garnish 8 on the vehicle interior side I of the inner panel 2 serving as the members on the side of the body 1 in the front pillar section FP and the roof side rail section RR using installing means, not shown. Furthermore, the airbag cover 10 composed of these lower edges 5a and 6a is configured such that the lower edges 5a and 6a are pushed by the airbag 25 and opened to the vehicle interior side I so that the airbag 25 can protrude at the time of development and inflation (as indicated by the two-dot chain lines in FIGS. 2 to 4 and as shown FIG. 20).

The inflator 12 is used to supply the inflation gas to the airbag 25, is a cylinder type having a nearly circular cylindrical shape as shown in FIG. 1, and is provided with gas discharge ports, not shown, capable of discharging the inflation gas to the tip end side thereof. The tip end side of the inflator 12 including the periphery of the gas discharge ports is inserted into the connection port section 51, described later, of the airbag 25 and connected to the airbag 25 using a clamp 15 disposed on the outer peripheral side on the side of the rear end 51a of the connection port section 51. What's more, the inflator 12 is installed on the inner panel 2 using the installing bracket 13 for holding the inflator 12 and a bolt 14 for fixing the installing bracket 13 to the inner panel 2 on the side of the body 1.

The airbag 25 is, as indicated by the two-dot chain lines in FIG. 1, is configured such that the airbag 25 is developed from its folded state by making the inflation gas from the inflator 12 flow thereinto and then developed and inflated toward the vehicle interior sides of the windows W1 and W2, the intermediate pillar garnish 7 and the rear pillar garnish 8 in the intermediate pillar section CP of the rear pillar section RP. In the case of the embodiment, as shown in FIG. 5A, the airbag 25 is composed of a bag body 26 for covering the vehicle interior sides of the windows W1 and W2 at the time of inflation completion, the connection port section 51 protruding upward from the upper edge 26a of the bag body 26 and connected to the inflator 12, installing pieces 53 formed so as to protrude upward from the side of the upper edge 26a of the bag body 26 and installed on the upper edge sides of the windows W1 and W2, and an installing belt 55 protruding from the vicinity of the upper end of the front edge of the bag body 26.

Figure 5:
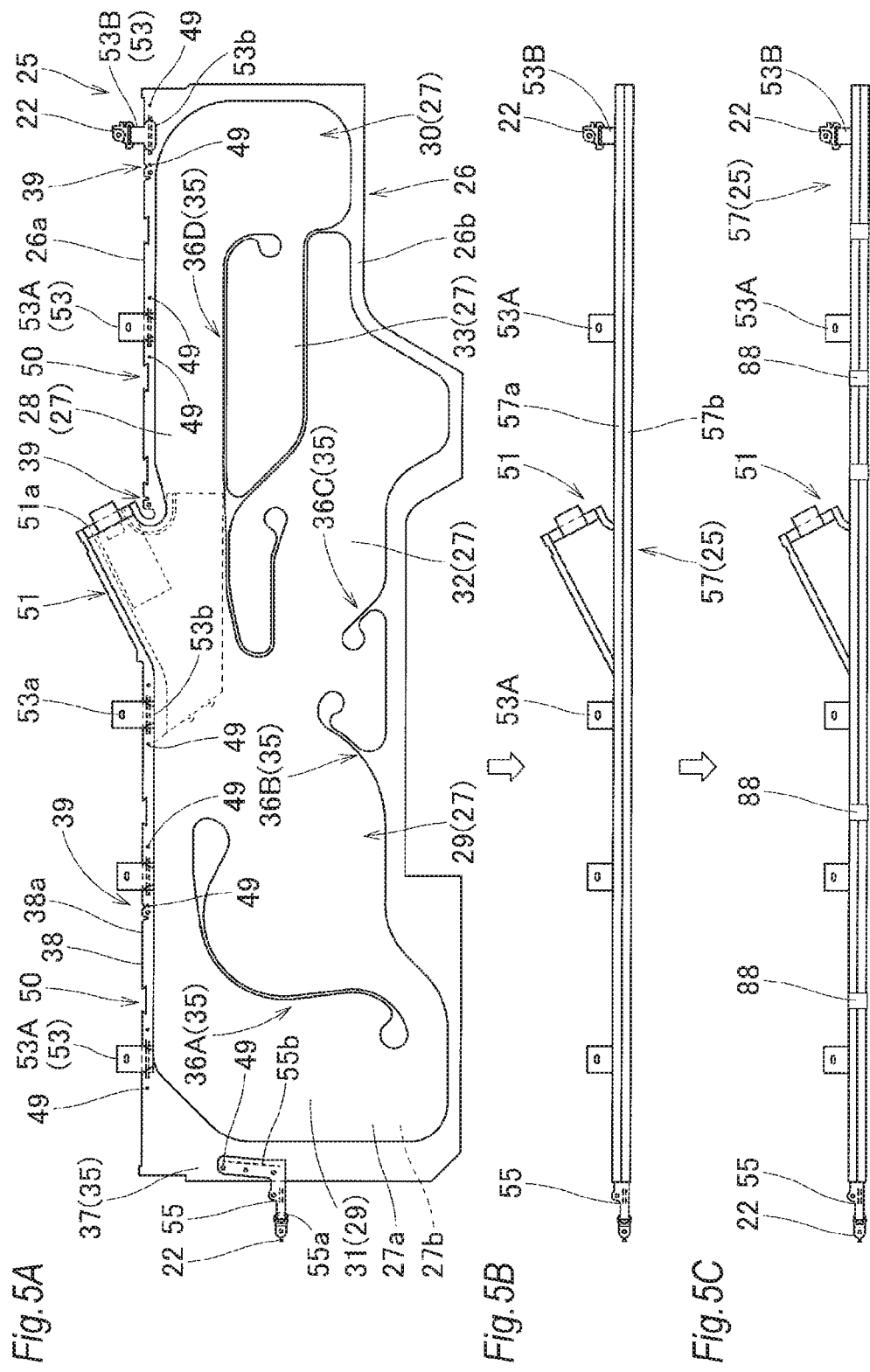
FIG. 5A is a front view showing the state in which the airbag for use in the head protection airbag device according to the embodiment is flatly developed.
FIGS. 5B and 5C are views sequentially showing the states in which the airbag is folded and wrapped with wrapping members.

As indicated by the two-dot chain lines in FIG. 1 and as shown in FIG. 5A, at the time of inflation completion, the external shape of the bag body 26 is formed into a nearly rectangular shape so that the longitudinal direction thereof is nearly aligned with the front-rear direction thereof so as to be able to cover the vehicle interior side ranging from the window W1 to the front side of the rear pillar section RP via the intermediate pillar section CP and the window W2. The bag body 26 is made by performing hollow weaving using a polyamide yarn or a polyester yarn. In the case of the embodiment, as well as the bag body 26, the connection port section 51 is also made by performing hollow weaving so as to be integrated with the bag body 26. The bag body 26 has an inflation section 27 that is inflated by making the inflation gas flow thereinto so that the vehicle interior side wall section 27*a* positioned on the vehicle interior side is separated from the vehicle exterior side wall section 27*h* positioned on the vehicle exterior side at the time of inflation completion and a non-inflation section (closing section) 35 that is formed by connecting the vehicle interior side wall section 27*a* and the vehicle exterior side wall section 27*b* so that the inflation gas is not made to flow thereinto.

As shown in FIG. 5A, the inflation section 27 has a gas guide passage 28 disposed so as to extend along the front-rear direction on the side of the upper edge 26*a* of the bag body 26, a front seat protection section 29 for covering the window W1 on the side of the front seat, a rear seat protection section 30 for covering the window W2 on the side of the rear seat, front auxiliary inflation sections 31 respectively disposed on the front side and the rear side of the front seat protection section 29 and adjacent thereto, a central auxiliary inflation section 32, and a rear auxiliary inflation section 33 disposed on the front side of the rear seat protection section 30 and adjacent thereto. The front auxiliary inflation sections 31 and the central auxiliary inflation section 32 communicate with the front seat protection section 29, and the rear auxiliary inflation section 33 communicates with the rear seat protection section 30, whereby the inflation gas is made to flow into the front auxiliary inflation sections 31 and the central auxiliary inflation section 32 via the front seat protection section 29, and the inflation gas is also made to flow into the rear auxiliary inflation section 33 via the rear seat protection section 30. The inflation is completed after the inflation of the front seat protection section 29 and the rear seat protection section 30 is completed. Furthermore, in the case of the embodiment, as shown in FIG. 5A, the bag body 26 is configured such that the inflation gas is made to flow into the inside over the nearly entire face except for a few areas, that is, partition sections 36A, 36B, 36C and 36D for partitioning the gas guide passage 28, the front seat protection section 29, the rear seat protection section 30, the front auxiliary inflation sections 31, the central auxiliary inflation section 32 and the rear auxiliary inflation section 33.

The connection port section 51 integrated with the bag body 26 communicates with the gas guide passage 28 nearly at the center of the gas guide passage 28 in the front-rear direction (nearly at the center of the bag body 26 in the front-rear direction) and is disposed so as to protrude upward from the gas guide passage 28. In the case of the embodiment, the connection port section 51 is formed so as to be inclined rearward and upward with respect to the gas guide passage 28, and an opening is formed on the side of the rear end 51*a* so that the inflator 12 can be inserted thereinto.

The non-inflation section (closing section) 35 has a peripheral edge section 37 constituting the outer peripheral edge of the inflation section 27 and the partition sections 36A, 36B, 36C and 36D disposed inside the area of the inflation section 27. The partition sections 36A, 36B, 36C and 36D are disposed nearly linearly so as to partition the gas guide passage 28, the from seat protection section 29, the rear seat protection section 30, the front auxiliary inflation sections 31, the central auxiliary inflation section 32 and the rear auxiliary inflation section 33.

As shown in FIG. 5A, the peripheral edge section 37 is formed so as to surround the entire circumference of the inflation section 27 of the bag body 26 and the entire circumference of the connection port section 51 except for the side of the rear end 51*a* of the connection port section 51. In the peripheral edge section 37, along an upper side portion 38 disposed on the side of the upper edge 26*a* of the bag body 26, engaging portions 39 with which engaging protrusions 65, described later, formed on the case 60 are engaged are formed at a plurality of positions. In the airbag 25 according to the embodiment, the engaging portions 39 are formed at one position in the area on the front side of the connection port section 51 and at two positions in the area on the rear side of the connection port section 51, three positions in total. More specifically, the engaging portions 39 are formed on the front side of the installing piece 53A disposed nearly at the center in the area on the front side of the connection port section 51 in the front-rear direction, on the rear side of the connection port section 51 and on the front side of the installing piece 53B in the vicinity of the rear end of the bag body 26. In the embodiment, the engaging portion 39 disposed on the front side of the installing piece 53B is taken as an example and described in detail.

Figure 6:
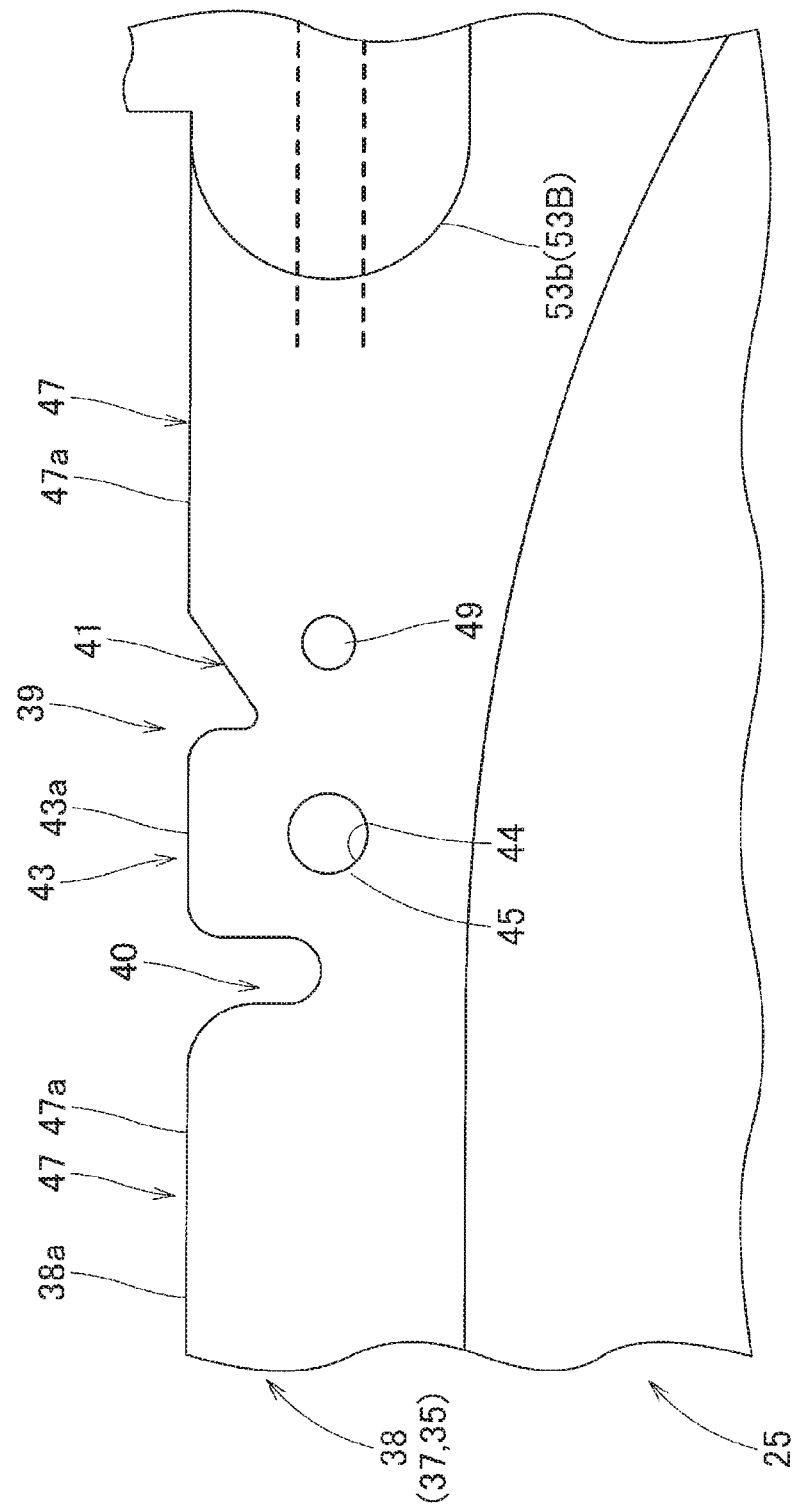
FIG. 6 is a partially enlarged front view showing a portion in the vicinity of the engaging portion formed on the upper edge side of the airbag shown in FIG. 5A.

As shown in FIG. 6, the engaging portion 39 is composed of a front recessed section 40 and a rear recessed section 41, these being recessed from the upper edge 38*a* of the upper side portion 38 and arranged in parallel in the front-rear direction. The engaging portion 39 further composed of a tab-shaped portion 43 formed of the area between the front recessed section 40 and the rear recessed section 41 and an engaging hole 44 formed in the tab-shaped portion 43 so that the engaging protrusion 65 of the case 60 can be inserted thereinto.

The tab-shaped portion 43 is configured so as to be separable by the front recessed section 40 and the rear recessed section 41 disposed on both sides thereof in the front-rear direction from the upper edges 47*a* of the general section 47 of the upper side portion 38 of the airbag 25 adjacent to the tab-shaped portion 43. In other words, the tab-shaped portion 43 is configured such that the side of the upper edge 43*a* can be pulled away from the folded body 57 that is formed by holding the airbag 25 (see FIG. 13B). The tab-shaped portion 43 is formed into a nearly rectangular shape, and the upper edge 43*a* is disposed nearly on the same line as the upper edges 47*a* of the general section 47 disposed on both sides thereof in the front-rear direction (the positions of the upper edges are aligned with each other in the up-down direction). Nearly at the center of the tab-shaped portion 43 in the front-rear direction, the engaging hole 44 is formed into an opening having a nearly circular shape so that the engaging protrusion 65 is inserted into the engaging hole 44 and is engageable with the peripheral edge 45 of the engaging hole 44. In the case of the embodiment, in the vicinity of the rear side of the engaging portion 39, a positioning opening 49 that is used at the time when the base section 53*b* of the installing piece 53B disposed on the rear side is joined to the bag body 26 is formed into an opening having a circular shape. In the case of the embodiment, this positioning opening 49 is disposed at a position behind the engaging hole 44 so that its center is nearly aligned with the center of the engaging hole 44 in the up-down direction. More specifically, the positioning opening 49 is disposed at a position below the rear recessed section 41, and the depth (the distance from the upper edge 38a to the bottom section of the recess) of the rear recessed section 41 is set smaller than that of the front recessed section 40 so that the rear recessed section 41 is disposed away from the positioning opening 49. The front recessed section 40 is configured such that the tip end of the recess is nearly aligned with the center of the engaging hole 44. In other words, the front recessed section 40 and the rear recessed section 41 respectively formed in front of and behind the tab-shaped portion 43 are asymmetrical in the front-rear direction. More specifically, the front recessed section 40 is formed so as to be recessed in a groove shape such that the upper and lower width dimensions thereof are made nearly coincident with each other, and the rear recessed section 41 is formed so as to be recessed in a nearly right-angled triangular shape such that the recessed section expands to the upper edge side. The opening width dimension of the upper edge side of the rear recessed section 41 is set larger than the opening width dimension of the upper edge side of the front recessed section 40. The shapes of the recesses of the front recessed section 40 and the rear recessed section 41 can be changed appropriately depending on the shape of the portion around the engaging protrusion 65 in the case 60. Furthermore, the recessed amounts and the opening width dimensions of the front recessed section 40 and the rear recessed section 41 and the separation distance from the upper edge 43a of the tab-shaped portion 43 to the center of the engaging hole 44 are set so that, when the folded body 57 is stored in the case 60, the engaging protrusion 65 can be smoothly inserted into the engaging hole 44 by covering the engaging protrusion 65 with the tab-shaped portion 43 from above and so that the engaged state of the engaging protrusion 65 and the engaging hole 44 after the insertion cannot be released easily.

Moreover, in the bag body 26 according to the embodiment, recessed sections 50 partially recessed downward from the upper edge 38a are formed at a plurality of positions in the upper side portion 38 of the peripheral edge section 37 along the front-rear direction (see FIG. 5A). These recessed sections 50 are formed at positions where wrapping members 88 capable of preventing the folded body 57 from collapsing are wound; at the time when the airbag 25 is folded, the wrapping members 88 are wound after the folded body 57 is formed (see FIG. 5C).

The installing pieces 53 and the installing belt 55 separated from the bag body 26 are portions for installing the side of the upper edge 26a of the airbag 25 (bag body 26) to the inner panel 2 on the side of the body 1 of the vehicle V. The installing pieces 53 and the installing belt 55 separated from the bag body 26 are formed of woven cloths made of polyamide yarn, polyester yarn, etc., and the sides of the base sections 53b and 55b thereof are sewn (joined) to the upper side portion 38 and the front edge side of the bag body 26 using sewing threads. Furthermore, the positioning openings 49 into which positioning pins (not shown) are inserted when the sides of the base sections 53h of the installing pieces 53 and the side of the base section 55b of the installing belt 55 are joined (sewn) to the bag body 26 are formed in the bag body 26. The positioning openings 49 are formed at the portions of the installing pieces 53, that is, positions in front of and behind each installing piece 53 so as to be nearly symmetrical in the front-rear direction (see FIG. 5A). The installing pieces 53, plural in number (five in the case of the embodiment), are disposed along the front-rear direction and formed so as to protrude upward from the upper edge 26a of the bag body 26. The installing belt 55 is formed so as to protrude forward from the front edge of the bag body 26. In the airbag 25 according to the embodiment, the four installing pieces 53A disposed on the front side are installed on the inner panel 2 using the installing clips 17, and, although detailed descriptions are omitted, the tip end 55a of the installing belt 55 and the installing piece 53B disposed on the rear end side are installed on the inner panel 2 using installing brackets 22 and bolts 23 (see FIGS. 1 and 5A). In each installing piece 53A to be installed on the inner panel 2 using the installing clip 17, an installing hole 53a into which the installing clip 17 is inserted is formed into an opening having a nearly rectangular shape.

Figure 2:
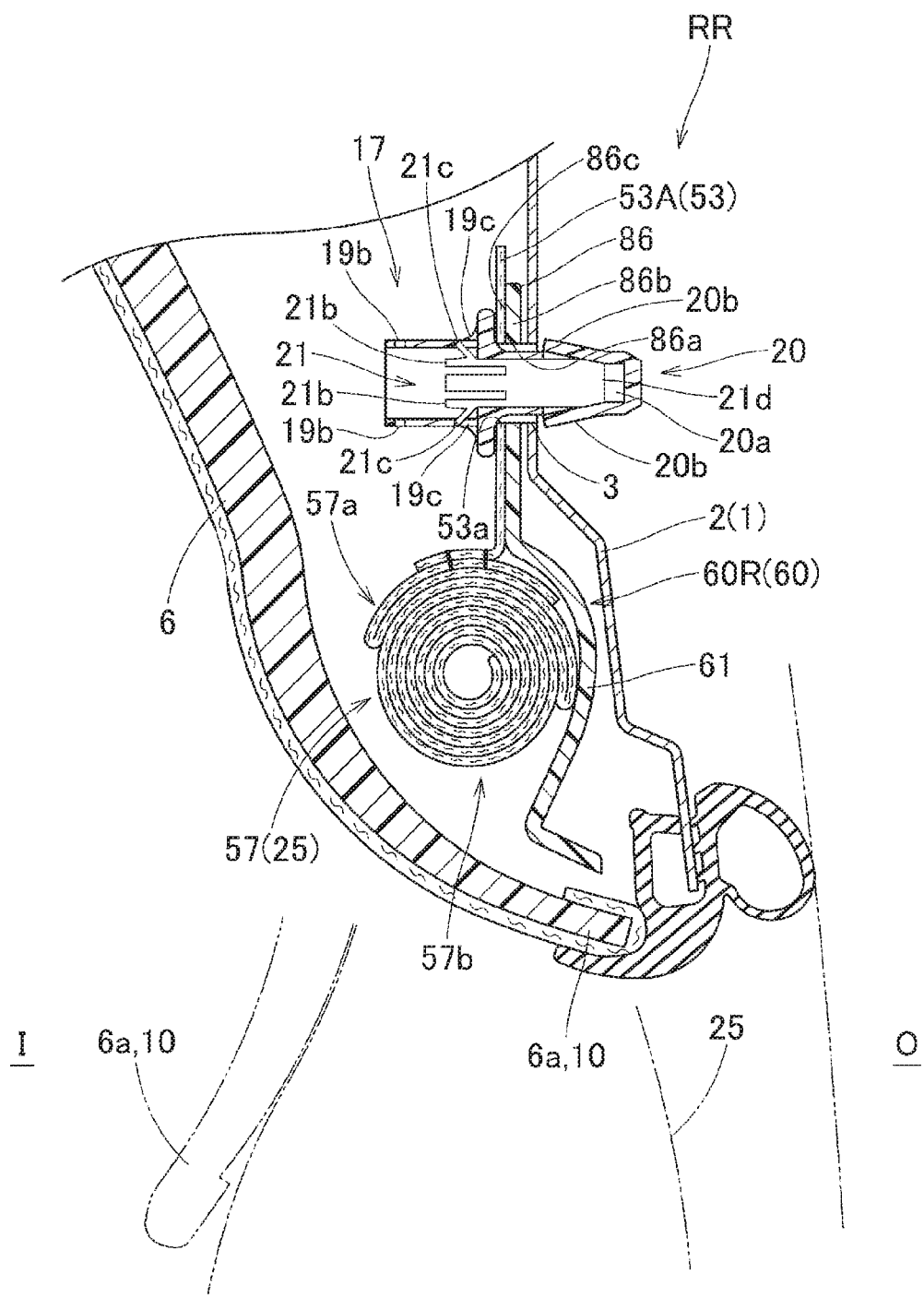
FIG. 2 is a vertical sectional view showing the head protection airbag device according to the embodiment in the state of being mounted on a vehicle, taken on line II-II of FIG. 1.
Figure 3:
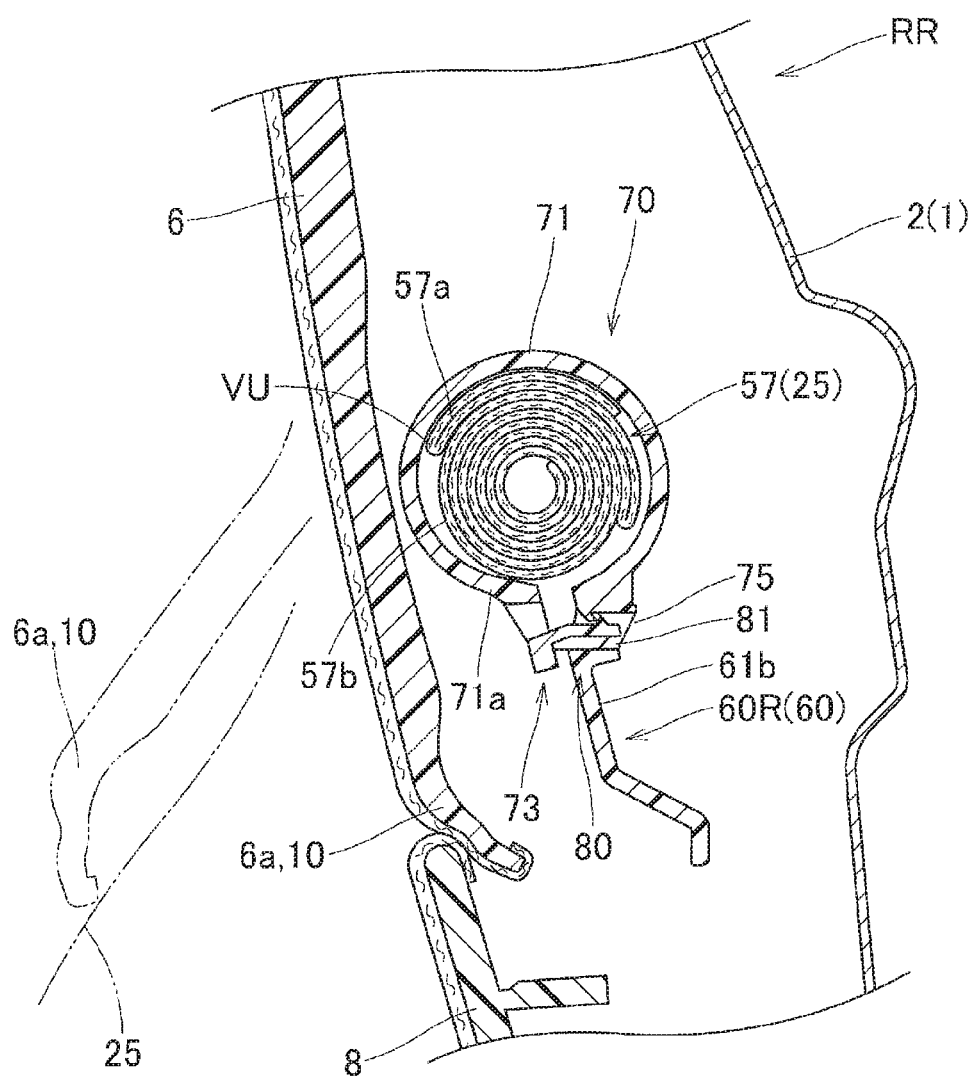
FIG. 3 is a vertical sectional view showing the head protection airbag device according to the embodiment in the state of being mounted on the vehicle, taken on line III-III of FIG. 1.
Figure 4:
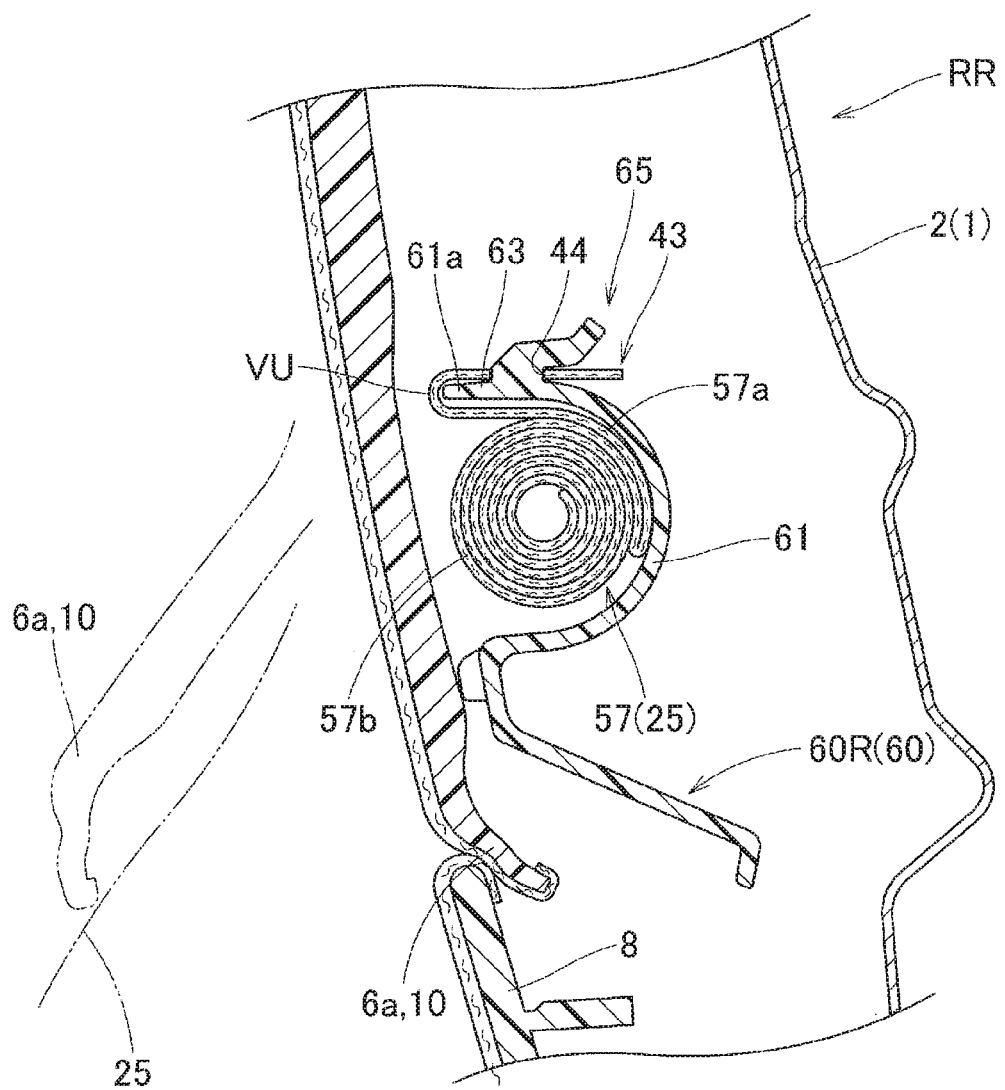
FIG. 4 is a vertical sectional view showing the head protection airbag device according to the embodiment in the state of being mounted on the vehicle, taken on line IV-IV of FIG. 1.

In the embodiment, the airbag 25 is folded such that the portion on the side of the upper edge 26a of the bag body 26 is bellows-folded and the area on the lower section side thereof is roll-folded so as to be wound from the side of the lower edge 26b toward the vehicle exterior side O. Since the folded body 57 that is formed by folding the airbag 25 is configured such that a bellows-folded portion 57a is placed on the upper side of a roll-folded portion 57b as shown in FIGS. 2 to 4, the upper side portion 38 of the peripheral edge section 37 is exposed on the side of the upper face 57c serving as the upper face of the bellows-folded portion 57a, and the tab-shaped portions 43 and the engaging holes 44 are also exposed.

Figure 12:
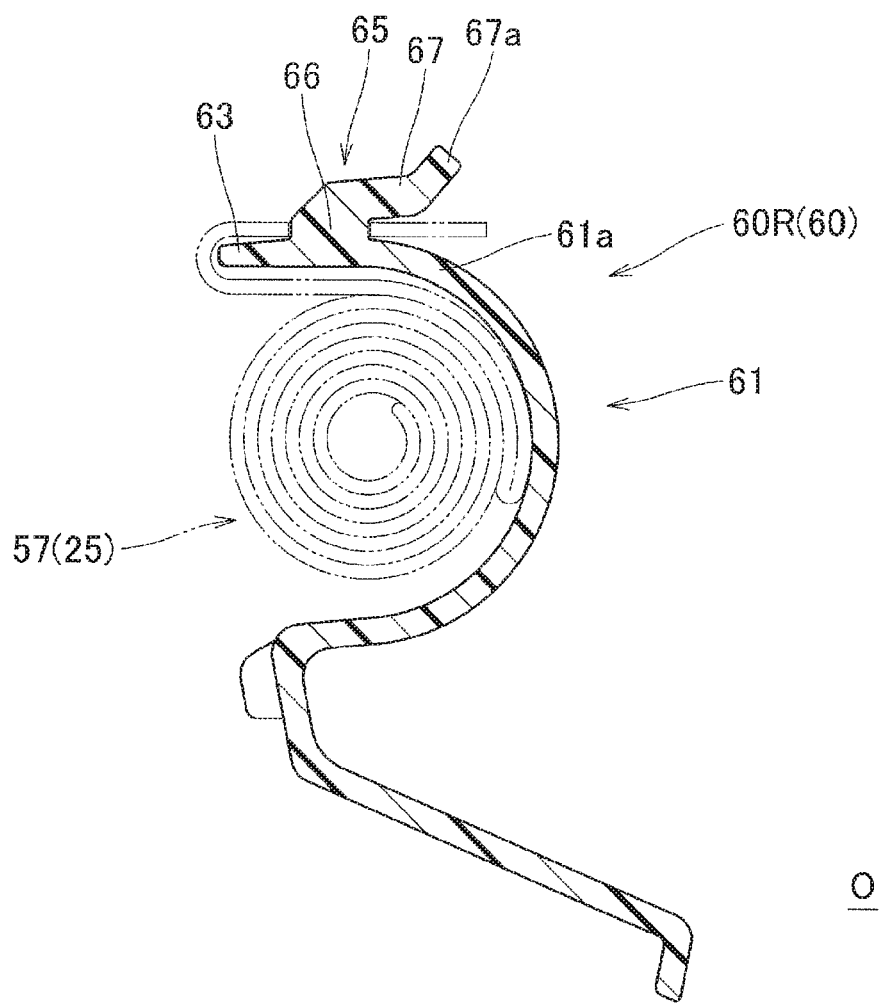
FIG. 12 is a sectional view taken on line XII-XII of FIG. 10.

The case 60 for storing the folded airbag 25 (folded body 57) is made of a thermoplastic elastomer; in the case of the embodiment, the case is made of a polyolefin thermoplastic elastomer (TPO). The case 60 is formed into a long shape extending in the front-rear direction. In the head protection airbag device M according to the embodiment, as shown in FIGS. 1 and 12, the case 60 is composed of two cases: a case 60F for storing the portion on the front side of the connection port section 51 and a case 60R for storing the portion on the rear side of the connection port section 51. In the embodiment, the case 60R disposed on the rear side is taken as an example and described in detail. Although the case 60F is different in external shape, the case 60F is similar to the case 60R in the configurations of the portions of the engaging protrusions 65 and winding bands 70 and the configuration in which the installing pieces 53A of the airbag 25 are installed using the installing clips 17. The case 60 also serves as a protector for protecting the folded airbag 25 (folded body 57), for example, when the airbag is carried, mounted on a vehicle and inflated, and for guiding the airbag in the development direction when the airbag is inflated, and the case 60 is disposed around the circumference of the folded body 57 so as to protect the airbag from interfering objects in the surrounding.

As shown in FIGS. 7 to 12, the case 60R is composed of a case body 61 for storing the folded body 57, the engaging protrusions 65 formed on the case body 61, the winding bands 70 wound around the folded body 57 stored inside the case body 61, and an installing seat section 86 to be installed on the inner panel 2 on the side of the body 1.

The case body 61 is formed so as to be curved in a nearly circular arc shape along the outer peripheral face of the folded body 57 and so as to cover the area ranging is from the vehicle exterior side O of the folded body 57 to the upper side (see FIG. 12).

Figure 7:
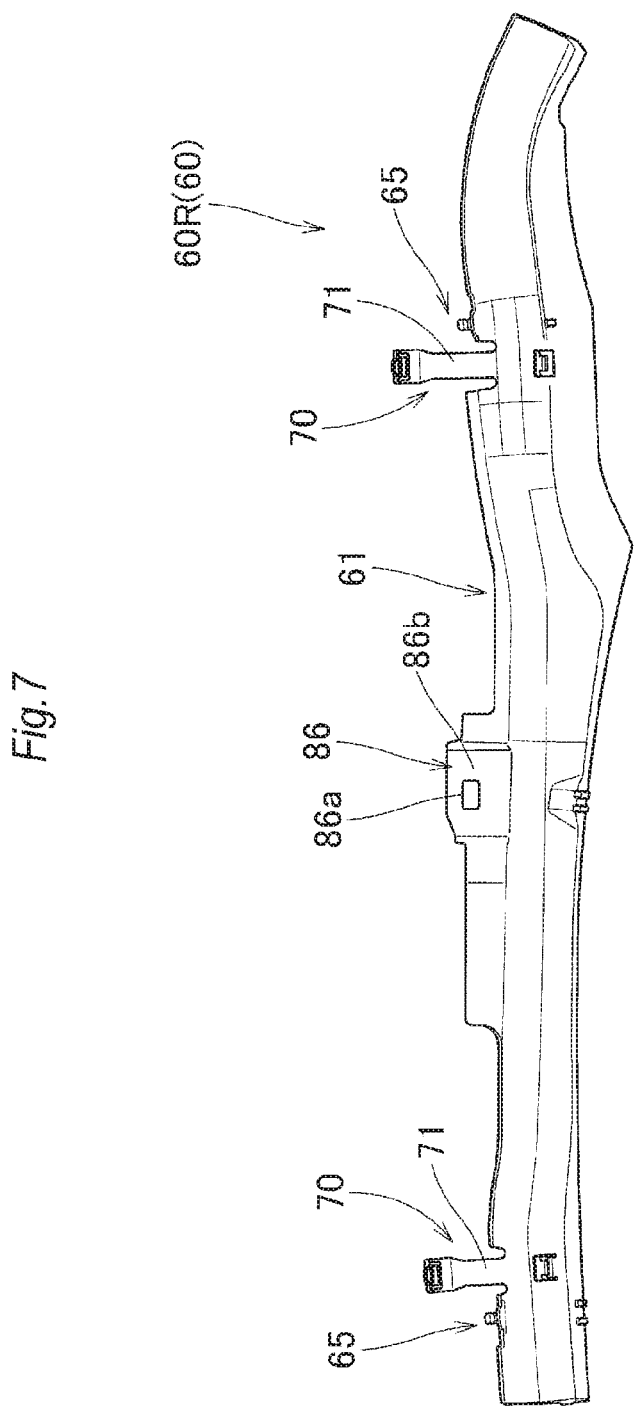
FIG. 7 is a schematic front view showing a case for use in the head protection airbag device according to the embodiment.
Figure 8:
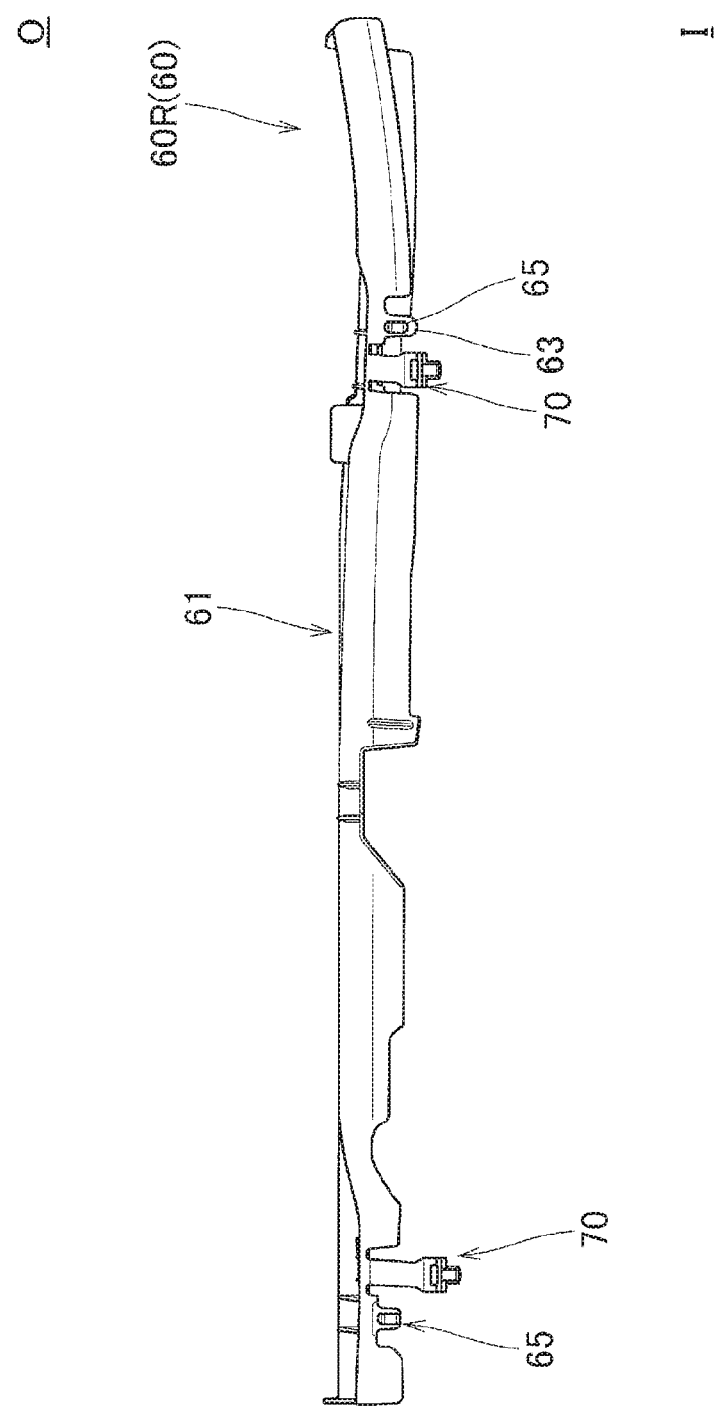
FIG. 8 is a schematic plan view showing the case shown in FIG. 7.
Figure 10:
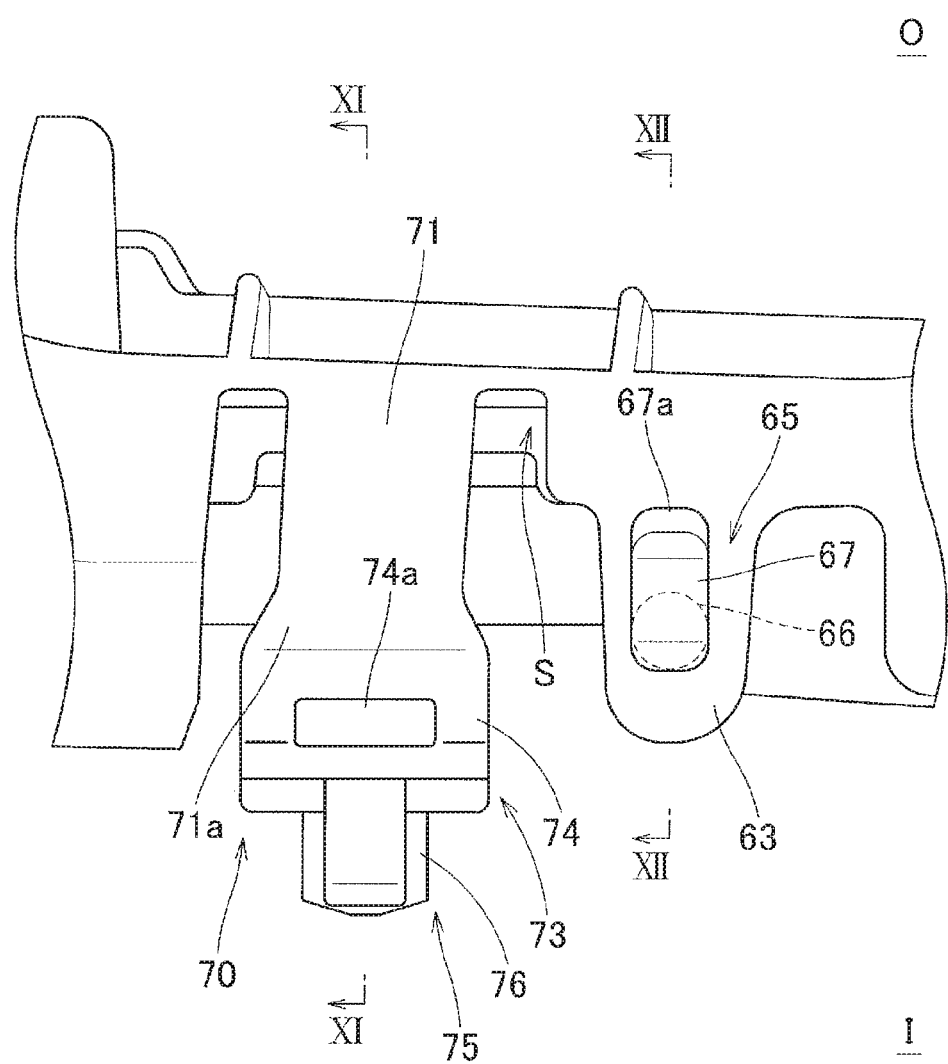
FIG. 10 is a partially enlarged plan view showing the portions of the engaging protrusion and the winding band in the case shown in FIG. 7.

As shown in FIGS. 7 and 8, the engaging protrusions 65 are formed at two positions: one position on the front end side of the case body 61 and the other position on the rear side from the center in the front-rear direction corresponding to the engaging portions 39 (tab-shaped portions 43) formed on the airbag 25. Each engaging protrusion 65 is formed so as to protrude outward (upward) on the side of the outer peripheral face (upper face) in the area covering the upper face side of the folded body 57 in the case body 61; in the embodiment, the engaging protrusion 65 is formed so as to protrude upward from a support section 63 formed of a portion in the vicinity of the upper edge 61a of the case body 61 covering the upper face side of the folded body 57. In the embodiment, as shown in FIGS. 8 and 10, the support section 63 is formed so as to partially protrude to the vehicle interior side I from the upper edge 61a of the case body 61. The engaging protrusion 65 is composed of a neck section 66 protruding upward from the support section 63 and a plate-shaped protrusion body 67 formed so as to protrude from the tip end of the neck section 66 to the vehicle exterior side O as shown in FIGS. 10 and 12. In the state in which the neck section 66 is inserted into the engaging hole 44, the protrusion body 67 is disposed so as to protrude to the vehicle exterior side O from the engaging hole 44 as viewed from the up-down direction (see FIG. 14B) and is engaged with the peripheral edge 45 of the engaging hole 44; in the embodiment, the tip end side portion 67a of the protrusion body 67 is inclined so that the tip end is positioned upward to facilitate the insertion of the protrusion body 67 into the engaging hole 44 (see FIG. 12).

Figure 9:
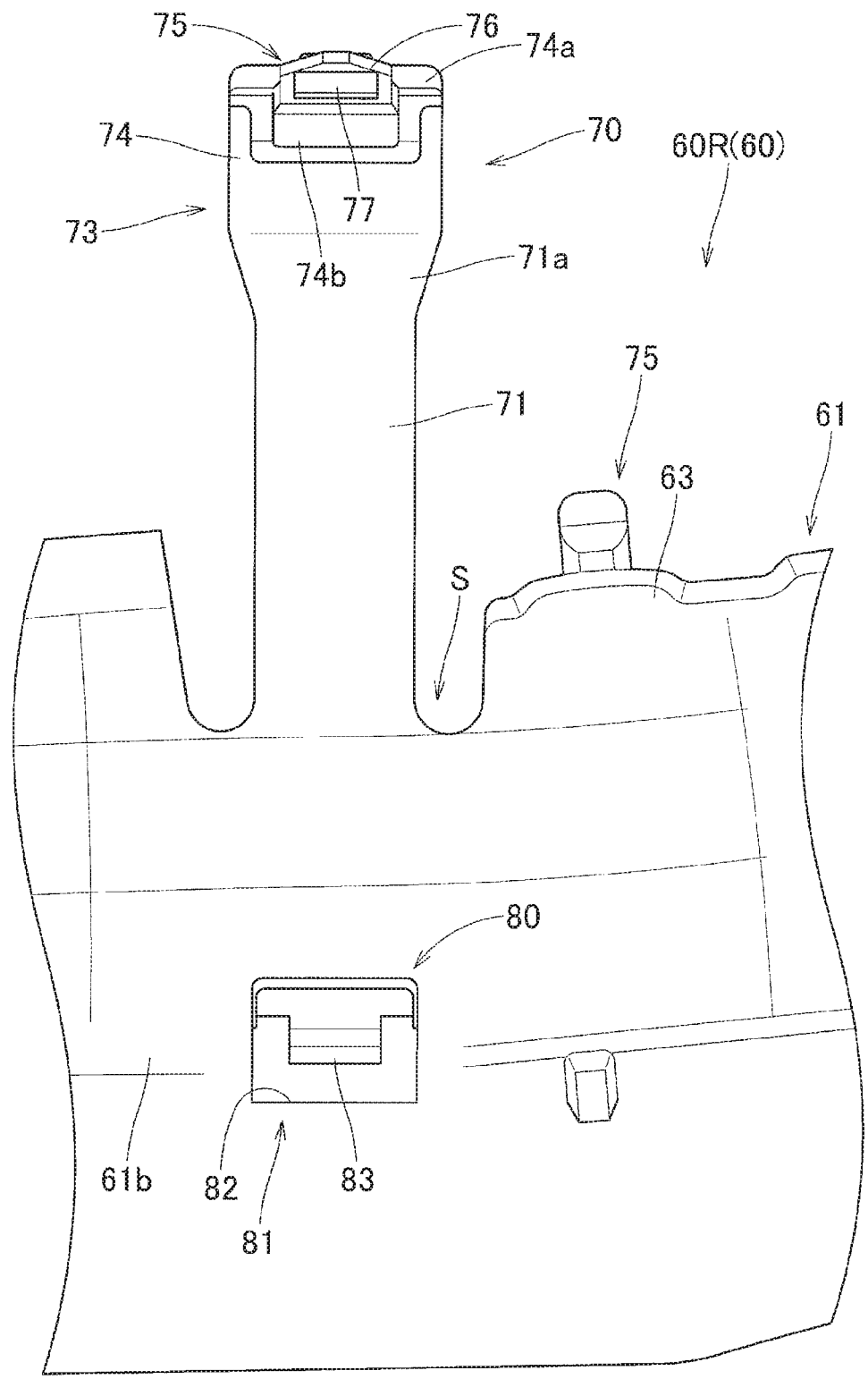
FIG. 9 is a partially enlarged front view showing the portions of an engaging protrusion and a winding band in the case shown in FIG. 7.
Figure 11:
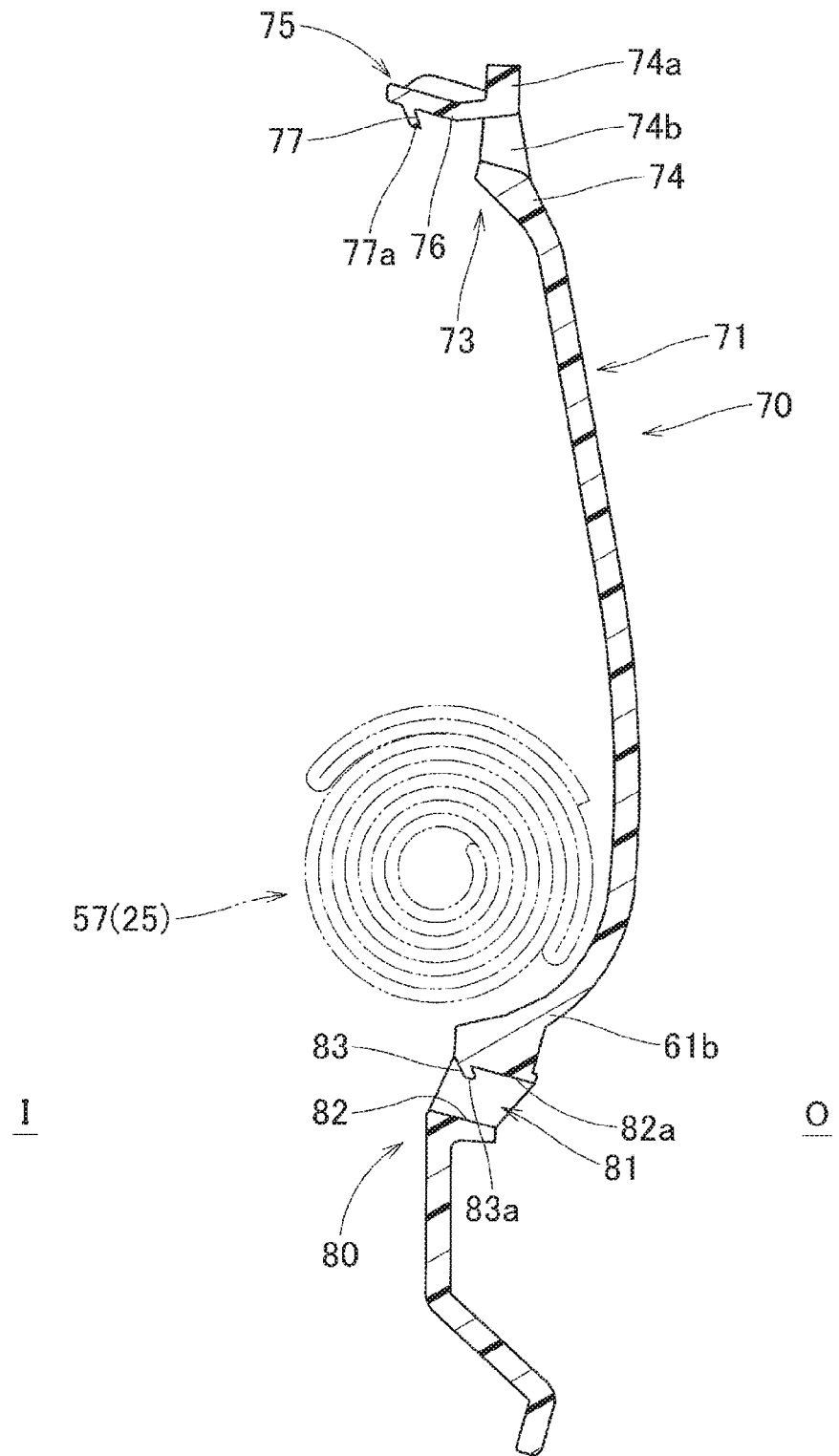
FIG. 11 is a sectional view taken on line XI-XI of FIG. 10.

The winding bands 70 are formed at positions in the vicinity of the engaging protrusions 65 of the case body 61. In the case 60R according to the embodiment, as shown in FIGS. 7 and 8, the winding band 70 on the front side is formed close to the rear side of the engaging protrusion 65, and the winding band 70 on the rear side is formed close to the front side of the engaging protrusion 65. The winding band 70 is formed so as to extend from the upper edge 61a of the case body 61. As shown in FIGS. 9 to 11, the winding band 70 is composed of a band body 71 having a nearly band shape, an engaging section 73 disposed on the side of the tip end 71a of the band body 71, and an engaged section 80 formed on the side of the case body 61 so as to be engaged with the engaging section 73. In the case of the embodiment, the band body 71 is, as shown in FIGS. 9 and 10, formed so as to extend from the upper edge 61a of the case body 61 while the band body 71 is disposed adjacent to the support section 63 from which the engaging protrusion 65 protrudes with a space S provided between the band body 71 and the support section 63.

The engaging section 73 is formed on the side of the tip end 71a of the band body 71 and is composed of a base section 74 having a nearly plate shape and being slightly wider than the band body 71 and an engaging pawl section 75 formed on the side of the tip end 74a of the base section 74. The engaging pawl section 75 is a portion to be inserted into an engaging recessed section 81, described later, in the engaged section 80 and is composed of a protruding piece 76 formed on the side of the tip end 74a of the base section 74 so as to protrude from the side of the inner peripheral face when the winding band is wound around the folded body 57, and a pawl piece 77 formed on the tip end side of the protruding piece 76 so as to protrude from the side of the inner peripheral face when the winding band is wound around the folded body 57. The width dimension of the protruding piece 76 on the side along the longitudinal direction (on the side along the front-rear direction) of the case body 61 (folded body 57) is set smaller than the width dimensions of the band body 71 and the base section 74, that is, the width dimension is set so that the protruding piece 76 can be inserted into an engaging recessed section 81, described later, in the engaged section 80. The protruding piece 76 is formed so as to protrude toward the vehicle exterior side O when the folded body is mounted on the vehicle. The pawl piece 77 is formed nearly along the width direction of the protruding piece 76 (the longitudinal direction of the folded body 57) and is formed so as to be inclined with respect to the protruding piece 76 so that the side of the tip end 77a thereof is oriented to the base section side of the protruding piece 76. The pawl piece 77 is configured so as to be engaged with a pawl piece 83 formed on the inner peripheral face 82 of the engaging recessed section 81 in the engaged section 80. In the case of the embodiment, the width dimension of the pawl piece 77 is set slightly smaller than the width dimension of the protruding piece 76. In addition, in the area of the base section 74 on the side of the band body 71, not on the side of the protruding piece 76, an opening 74b having a nearly rectangular shape is formed adjacent to the protruding piece 76 so as to pass through the area. The width dimension of this opening 74b in the front-rear direction is set almost equal to the width dimension of the protruding piece 76. The opening 74b is formed so that the portion in the vicinity of the protruding piece 76 is made flexible and so that the engaged state between the pawl pieces 77 and 83 is released smoothly when the airbag 25 is developed and inflated.

The engaged section 80 is formed in the vicinity of the lower end 61b of the case body 61 and at the position corresponding to the band body 71 (the position nearly aligned with the band body 71 in the front-rear direction) and has the engaging recessed section 81 into which the engaging pawl section 75 is inserted so as to be engageable. The engaging recessed section 81 is formed so as to be recessed toward the vehicle exterior side O in the engaged section 80 along the protruding direction of the engaging pawl section 75 so that the engaging pawl section 75 can be inserted thereinto. In the case of the embodiment, as shown in FIG. 11, the engaged section 80 is formed so as to pass through the engaged section 80 in the vehicle interior and exterior directions. The opening width dimensions of the engaging recessed section 81 in the up-down direction and the front-rear direction are set to dimensions so that the engaging pawl section 75 can be inserted into the engaging recessed section 81. On the inner peripheral face of the engaging recessed section 81 and on the end side on the upper face side thereof on the vehicle interior side I serving as the side of the folded body 57, the pawl piece 83 is formed corresponding to the pawl piece 77 of the engaging pawl section 75 so as to be engageable with the pawl piece 77. The pawl piece 83 is disposed nearly along the longitudinal direction of the case body 61 (folded body 57) so as to be nearly along the pawl piece 77 formed on the engaging pawl section 75. In the case of the embodiment, the pawl piece 83 protrudes downward from the side of the upper face 82a of the inner peripheral face 82 of the engaging recessed section 81 while its tip end 83a is oriented to the vehicle exterior side O so as to be engageable with the pawl piece 77.

In the winding band 70 according to the embodiment, the engaging pawl section 75 of the engaging section 73 is configured so as to be engaged with the engaging recessed section 81 of the engaged section 80 by engaging the pawl pieces 77 and 83 with each other. The mutual engaging force between the pawl pieces 77 and 83 is set so that the pawl pieces are bent mutually and the engaged state can be released at the development and inflation time of the airbag 25 and so that the engaged state cannot be released easily even if the engaging section 73 is pulled by hand after the winding band 70 is wound around the folded body 57 having been stored inside the case body 61.

The installing seat section 86 is disposed at the position corresponding to the installing piece 53A disposed so as to protrude from the folded body 57; in the case 60R according to the embodiment, the installing seat section 86 is formed at one position on the nearly forward side of the center in the front-rear direction (see FIG. 7), In the installing seat section 86, an installing hole 86a, through which the installing leg 20 of the installing clip 17 passes, is formed corresponding to the installing hole 53a of the installing piece 53A. so as to pass through in the vehicle interior and exterior directions.

As shown in FIG. 2, the installing clip 17 for installing the installing piece 53A on the inner panel 2 together with the installing seat section 86 is engaged with an installing hole 3 formed in the inner panel 2. The installing clip 17 is an expansion rivet type made of a synthetic resin and is composed of an installing base 18 and a push pin 21 disposed inside the installing base 18 (see FIGS. 2 and 17). The installing base 18 is composed of a base section 19 disposed on the vehicle interior side I and the installing leg 2C) extended from the base section 19 to the side of the installing hole 3 of the inner panel 2 (the vehicle exterior side O) and installed on the peripheral edge of the installing hole 3.

Figure 17:
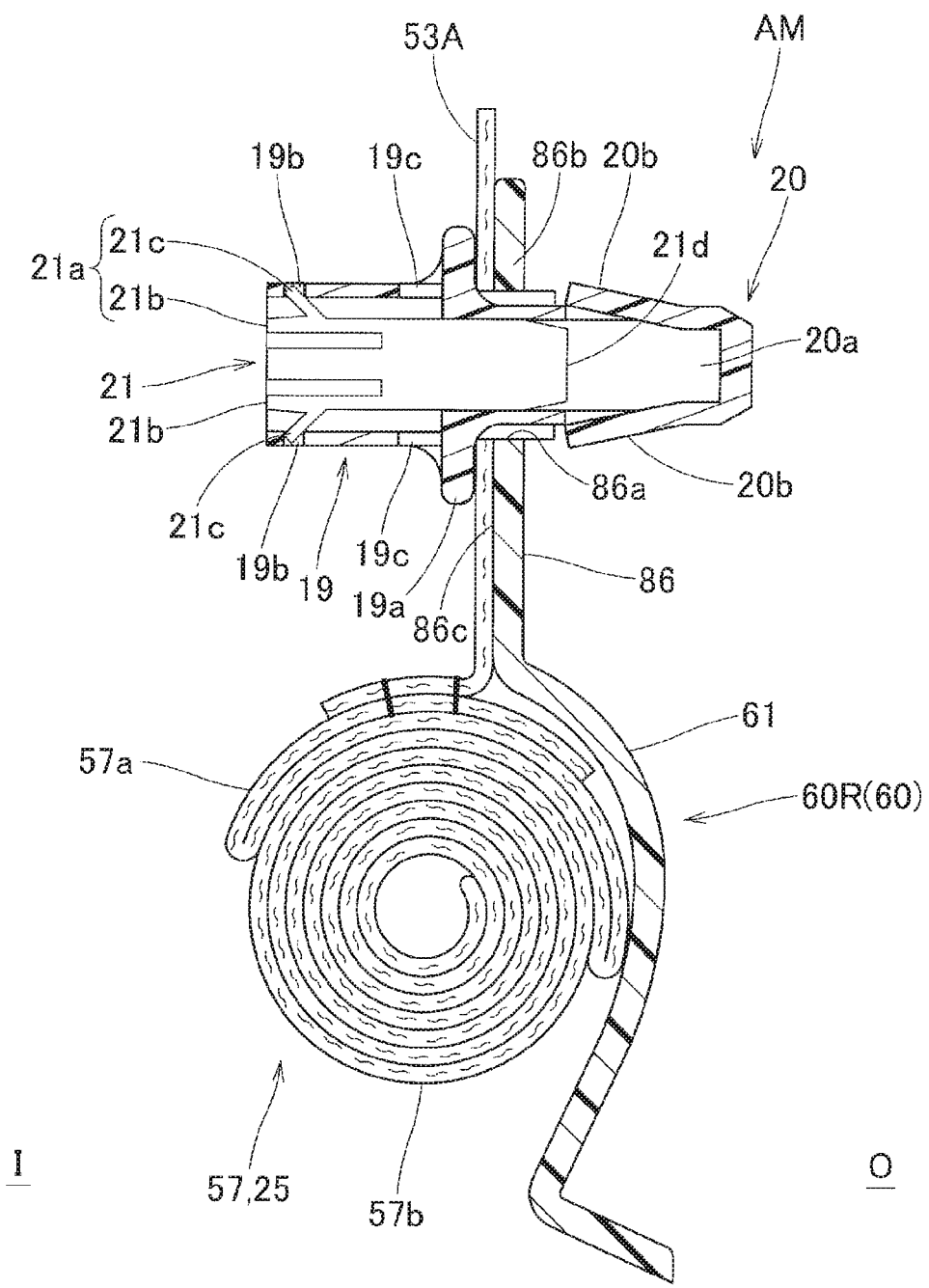
FIG. 17 is a vertical sectional view showing the airbag assembly, taken on line XVII-XVII of FIG. 16.

The base section 19 has a push pin accommodating section 19a in which the push pin 21 is accommodated in the state before the base section 19 is installed on the peripheral edge of the installing hole 3 and a pressing plate section 19d having a nearly rectangular shape being wide in the up-down direction and in the front-rear direction and disposed at the end section of the base section 19 on the vehicle exterior side. The pressing plate section 19d is a portion that is used to press the installing piece 53A to the side of the installing seat section 86 when the installing clip 17 is temporarily fixed to the installing seat section 86 of the case 60R via the installing piece 53A as shown in FIG. 17. The push pin accommodating section 19a is configured so as to be opened on the vehicle interior side I so that the push pin 21 can be pushed toward the vehicle exterior side O, and the portion thereof covering the upper side of the push pin 21 and the portion covering the lower side of the push pin 21 are respectively provided with engaging holes 19b and 19c that are capable of being engaged with the protrusion bodies 21c of engaging protrusion sections 21a formed on the push pin 21. These engaging holes 19b and 19c are respectively formed at two positions along the vehicle interior and exterior directions (the pushing direction of the push pin 21). The engaging holes 19b disposed on the vehicle interior side I are engaged with the protrusion bodies 21c of the push pin 21 being in the state before the pushing as shown in FIG. 17, and the engaging holes 19c disposed on the vehicle exterior side O are engaged with the protrusion bodies 21c of the push pin 21 being in the state after the pushing as shown in FIG. 2.

The installing leg 20 is configured so as to be inserted into the installing holes 53a and 86a passing through the installing piece 53A of the airbag 25 and the installing seat section 86 of the case 60R, respectively, whereby the installing piece 53A can be temporarily fixed to the installing seat section 86. The installing leg 20 is also configured so as to be inserted into the installing hole 3 formed in the inner panel 2 on the side of the body 1 of the vehicle V, whereby the installing seat section 86 and the installing piece 53A can be installed on the side of the body 1. An insertion recessed section 20a is formed inside the installing leg 20 so as to communicate with the push pin accommodating section 19a. This insertion recessed section 20a is a portion into which the extended shaft section 21d of the push pin 21 is inserted when the push pin 21 is pushed as shown in FIG. 2. Furthermore, a pair of expanded hook sections 20b is formed on the installing leg 20.

As shown in FIGS. 2 and 17, the push pin 21 is configured such that the engaging protrusion sections 21a engageable with the engaging holes 19h and 19c formed in the push pin accommodating section 19a are disposed on the base section side (vehicle interior side I) of the push pin 21 and such that the extended shaft section 21d disposed between the expanded hook sections 20b at the time of the pushing is disposed. on the tip end side (vehicle exterior side O). The engaging protrusion sections 21a formed on the side of the base section are formed at two positions being opposed to each other in the up-down direction. Furthermore, each of the engaging protrusion sections 21a has a bending piece 21b disposed along the vehicle interior and exterior directions and being bendable inward in the up-down direction and the protrusion body 21c formed so as to protrude outward in the up-down direction on the tip end side (the end face on the vehicle interior side) of the bending piece 21h. Still further, in the state before the pushing, the protrusion body 21c is inserted into the engaging hole 19b formed in the push pin accommodating section 19a and is engaged with the peripheral edge of the engaging hole 19b. The engaging protrusion section 21a is configured such that the protrusion body 21c can be removed from the engaging hole 19h by bending the bending piece 21h inward in the up-down direction. More specifically, the protrusion body 21c is removed from the engaging hole 19h while the bending piece 21b is bent inward in the up-down direction, and the push pin 21 is pushed so that the extended shaft section 21d is inserted into the insertion recessed section 20a. When the protrusion body 21c has reached the engaging hole 19c on the vehicle exterior side O, the bending piece 21b is restored to its original shape and inserted into the engaging hole 19c on the vehicle exterior side O and is engaged with the peripheral edge of the engaging hole 19c, At this time, the extended shaft section 21d disposed on the tip end side is inserted between the expanded hook sections 20b.

Furthermore, in the installing clip 17, when an airbag assembly AM is formed by storing the folded body 57 having been formed by folding the airbag 25 in the case 60 (60F and 60R), the extended hook sections 20b are engaged with the peripheral edge portion of the installing hole 86a of the installing seat section 86 in the state in which the push pin 21 is not pushed into the insertion recessed section 20a (in the state in which the protrusion bodies 21c have been engaged with the peripheral edges of the engaging holes 19b), whereby the installing clip 17 is temporarily fixed to the installing seat section 86 via the installing piece 53A (see FIG. 17). Moreover, when the installing seat section 86 is installed on the inner panel 2, in the airbag assembly AM, in the state in which the installing leg 20 of the installing clip 17 protruding from the installing seat section 86 of the case 60 to the vehicle exterior side O is inserted into the installing hole 3 of the inner panel 2, the protrusion bodies 21c are inserted into the engaging holes 19b on the vehicle exterior side O (see FIG. 2) by pushing the extended shaft section 21d of the push pin 21 into the insertion recessed section 20a while the bending pieces 21b are bent to the central side in the up-down direction, whereby the protrusion bodies 21c are engaged with the peripheral edges of the engaging holes 19c and the extended shaft section 21d is inserted between the expanded hook sections 20b. As a result, the expanded hook sections 20b engage with the peripheral edge of the installing hole 3 on the vehicle exterior side O, whereby the installing piece 53A is installed on the inner panel 2 on the side of the body 1 of the vehicle V together with the installing seat section 86 of the case 60 (60F and 60R).

Figure 14A:
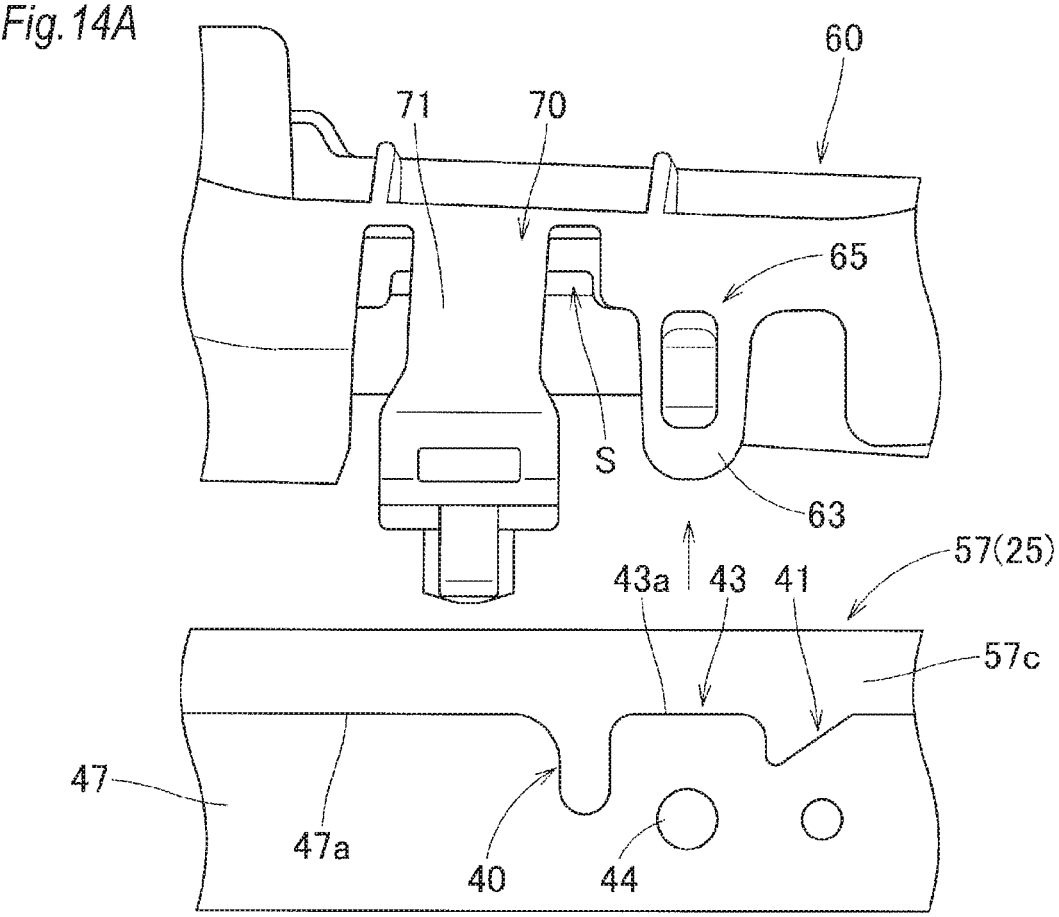
FIGS. 14A and 14B are partially enlarged plan views showing the steps in which the tab-shaped portion of the airbag is engaged with the engaging protrusion of the case at the time when the folded body of the airbag is stored in the case.

Next, the mounting of the head protection airbag device M on the vehicle V will be described. First, the airbag 25 is folded as shown in FIG. 5B. In the case of the embodiment, in the airbag 25 being in a flatly developed state so that the vehicle interior side wall section 27*a* and the vehicle exterior side wall section 27*b* are placed on each other, the area on the side of the upper edge 26*a* of the airbag 25 is bellows-folded along a folding line formed in nearly parallel with the upper edge 26*a* to form the bellows-folded portion 57*a* and the lower area thereof is folded by performing roll-folding so that the lower edge 26*b* is rolled on the side of the vehicle exterior side wall section 27*b* to form the roll-folded portion 57*b,* thereby forming the folded body 57. In the folded body 57 according to the embodiment, as shown in FIGS. 2 to 4, a folding line VU folded at a position on the vehicle interior side I is provided at a position below the engaging portions 39, and the engaging portions 39 (the tab-shaped portions 43 and the engaging holes 44) are exposed on the upper face side of the folded body 57 (see FIG. 14A). After the folding of the airbag 25 is completed, the tape-shaped wrapping members 88 capable of preventing the folded body from collapsing and capable of being broken at the time of the inflation of the airbag; 25 are wound around a plurality of positions (the areas in which the recessed sections 50 are disposed) in the folded body 57 in the front-rear direction (see FIG. 5C).

Figure 18:
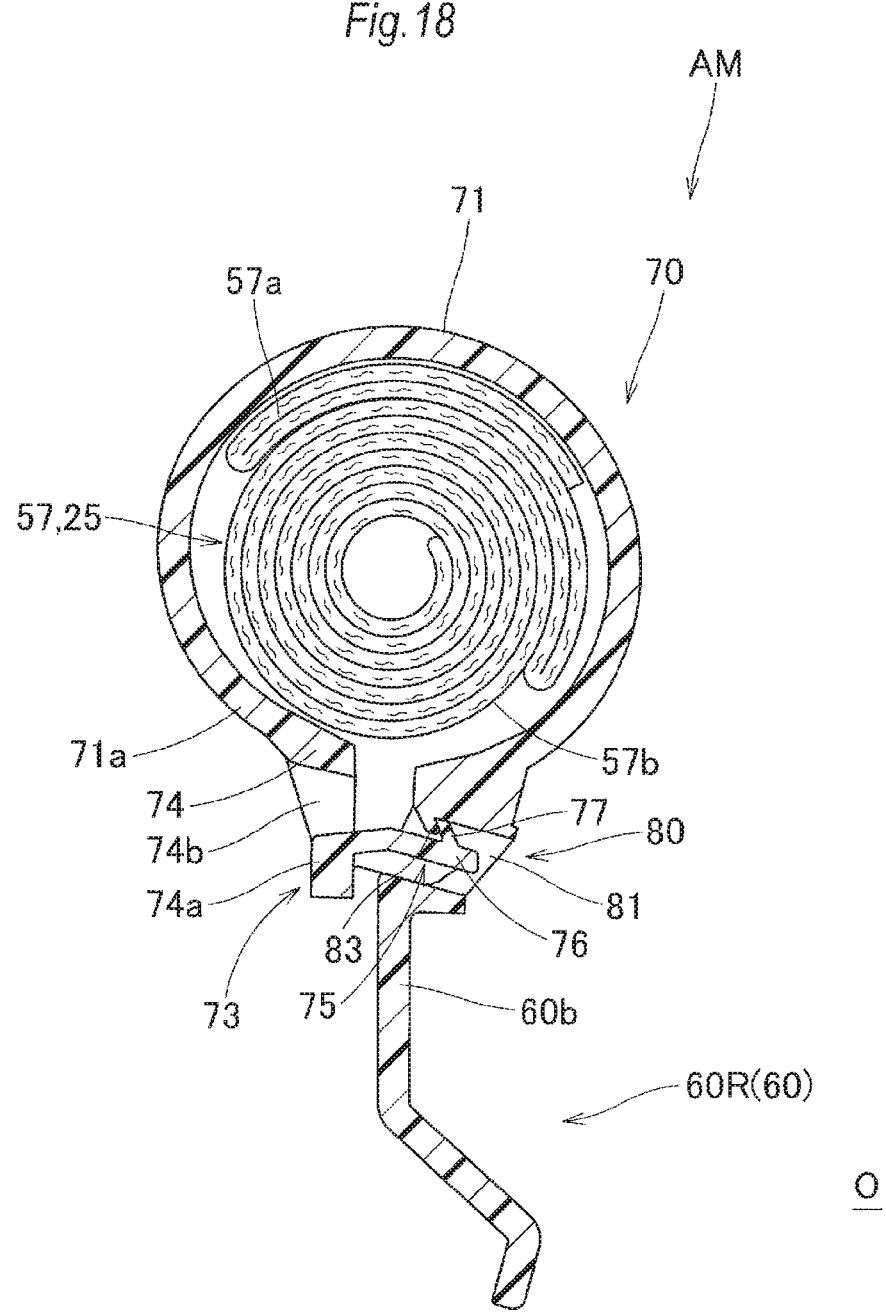
FIG. 18 is a vertical sectional view showing the airbag assembly, taken on line XVIII-XVIII of FIG. 16.
Figure 19:
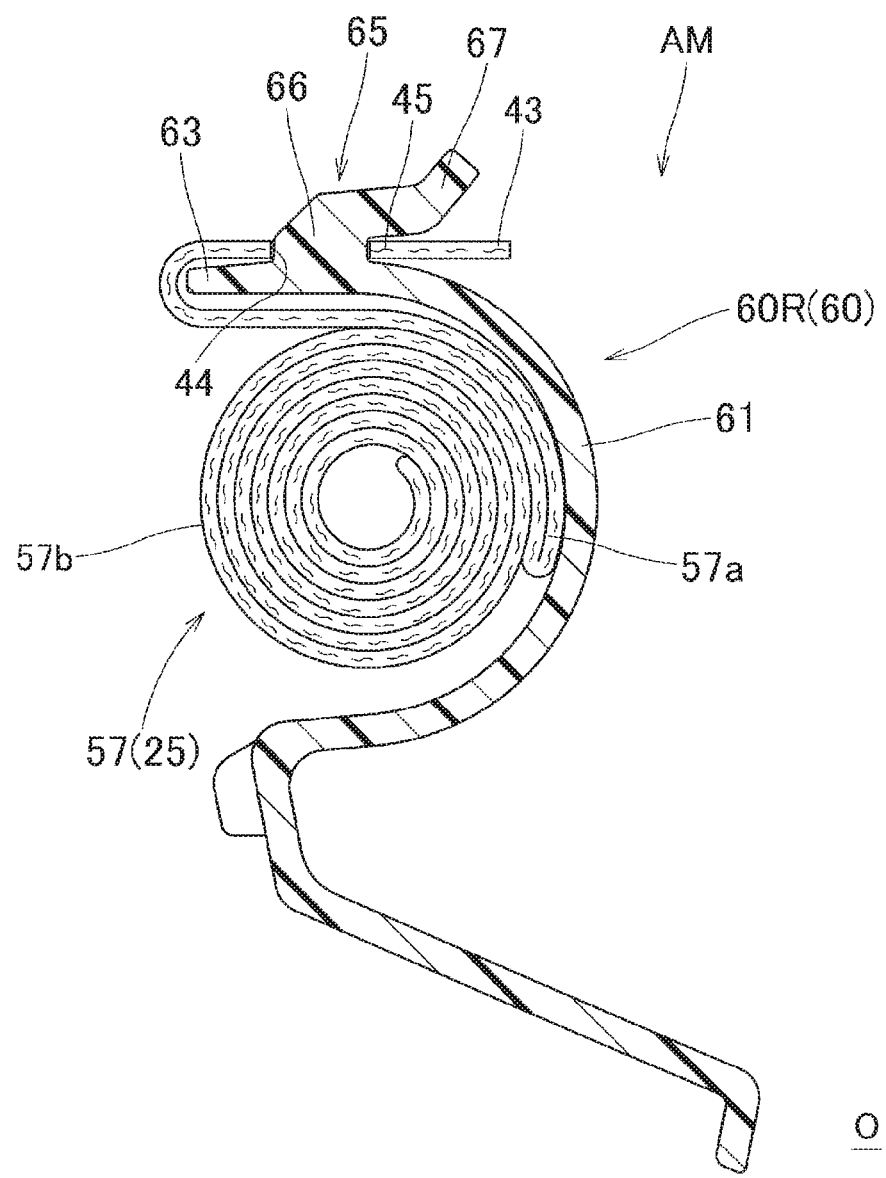
FIG. 19 is a vertical sectional view showing the airbag assembly, taken on line XIX-XIX of FIG. 16.

Next, the folded body 57 is stored in the case 60 (60F and 60R). At this time, as shown in FIGS. 13A to 13C and FIGS. 14A to 14C, while the tab-shaped portion 43 exposed on the upper face side of the folded body 57 is pulled so as to separate from the folded body 57, the engaging protrusion 65 is inserted into the engaging hole 44 formed in the tab-shaped portion 43 by covering the engaging protrusion 65 with the tab-shaped portion 43 from above the support section 63 from which the engaging protrusion 65 protrudes in the case body 61 (see FIG. 19). After that, the band body 71 of the winding band 70 to be disposed in the vicinity of the engaging protrusion 65 is wound around the folded body 57 as shown in FIGS. 15A and 1513, the engaging pawl section 75 formed on the side of the tip end 71*a* of the band body 71 is pushed into the engaging recessed section 81 formed on the side of the tip end 61*b* of the case body 61, the pawl piece 77 of the engaging pawl section 75 is engaged with the pawl piece 83 formed on the inner peripheral face 82 of the engaging recessed section 81, and the circumference of the folded body 57 is wrapped with the band body 71 of the winding band 70 (see FIG. 18). Furthermore, While the mounting piece 53A is placed on the vehicle interior side face 86*c* of the installing seat section 86, the installing leg 20 of the installing clip 17 is inserted into the installing holes 53*a* and 86*a* of the installing piece 53A and the installing seat section 86 from the side of the vehicle interior side face 86*c,* the installing leg 20 is engaged with the peripheral edge portion 86*b* of the installing hole 86*a* in the installing seat section 86, and the installing clip 17 is temporarily fixed to the installing seat section 86 (see FIG. 17). The installing bracket 22 is installed on the installing piece 53B, the inflator 12 on which the installing bracket 13 has been installed is inserted into the connection port section 51 of the airbag 25 protruding from the folded body 57, and the connection port section 51 is connected to the inflator 12 with the clamp 15, whereby the airbag assembly AM shown in FIGS. 16 to 19 can be formed.

After that, the installing leg 20 of the installing clip 17 protruding from the airbag assembly AM is inserted into the installing hole 3 formed in the inner panel 2, and the push pin 21 is pushed so that the extended shaft section 21*d* of the installing clip 17 is disposed on the side of the expanded hook sections 20*b,* whereby the expanded hook sections 20*b* can be engaged with the peripheral edge of the installing hole 3 and the installing piece 53A can be installed on the inner panel 2 on the side of the body 1 together with the installing seat section 86 of the case 60 as shown in Fig At the same time, the installing bracket 13 of the inflator 12 is fixed at a predetermined position on the inner panel 2 using the bolt 14, and the installing bracket 22 installed on the installing piece 53B is fixed at a predetermined position on the inner panel 2 using the bolt 23, whereby the airbag assembly AM can be mounted on the vehicle V. After that, lead wires, not shown, extending from a controller for operating the inflator 12 are connected to the inflator 12, and the front pillar garnish 5, the roof head lining 6, the intermediate pillar garnish 7 and the rear pillar garnish 8 are installed on the inner panel 2 on the side of the body 1, whereby the head protection airbag device M can be mounted on the vehicle V.

Figure 20:
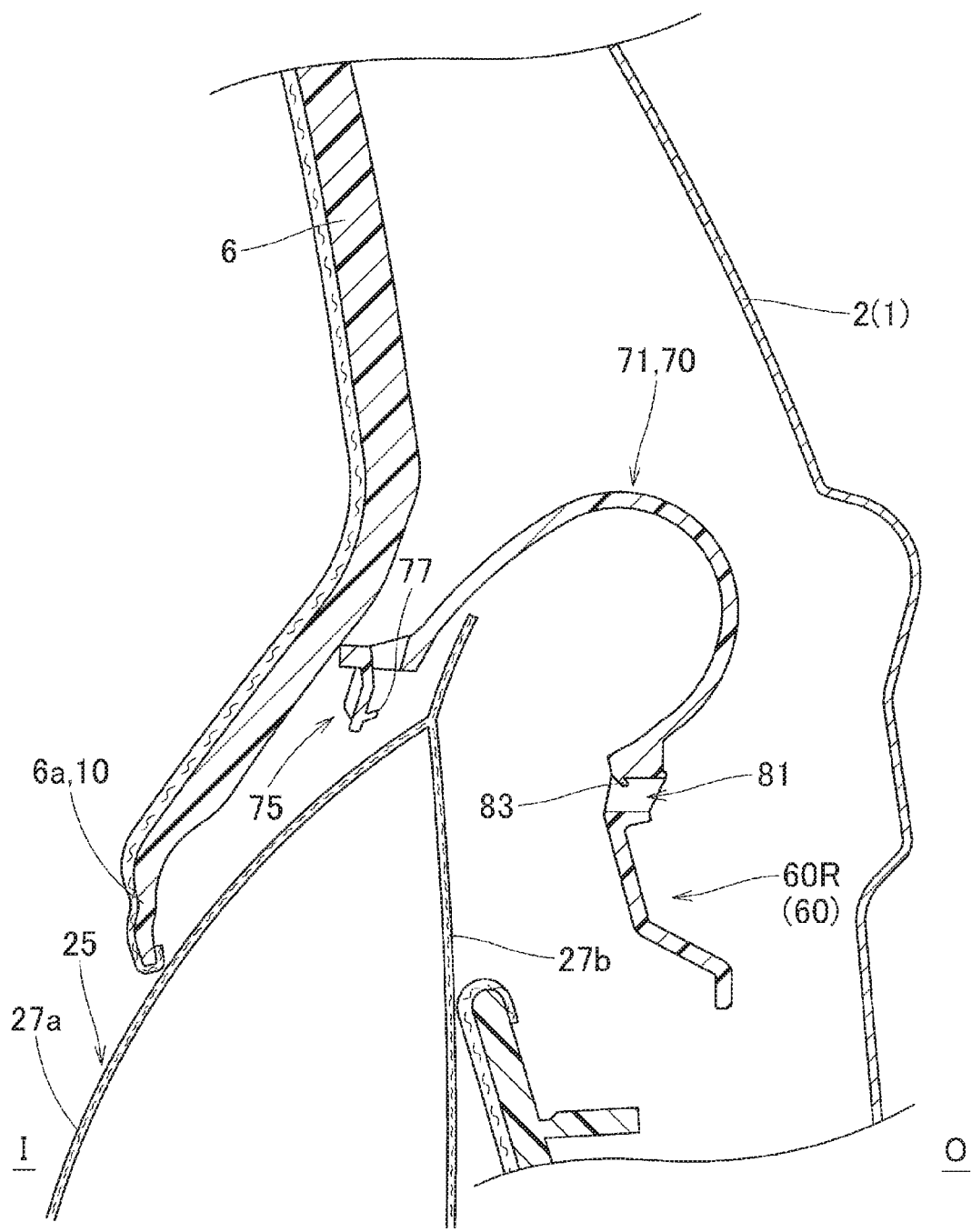
FIG. 20 is a vertical sectional view showing the head protection airbag device according to the embodiment in the state in which the inflation of the airbag is completed.

If the inflator 12 is operated by receiving an operation signal from the controller after the head protection airbag device M is mounted on the vehicle V, the inflation gas discharged from the inflator 12 flows into the airbag 25, the airbag 25 being inflated breaks the wrapping members 88 and pushes and opens the airbag cover 10 while disengaging the engaged state between the engaging section 73 and the engaged section 80 in the winding band 70. The airbag 25 is further developed while protruding downward and is inflated so as to cover the vehicle interior sides of the windows W1 and W2, the center pillar section CP and the rear pillar section RP as indicated by the two-dot chain lines in FIG. 1 and as shown in FIG. 20, whereby the inflation is completed.

Figure 14B:
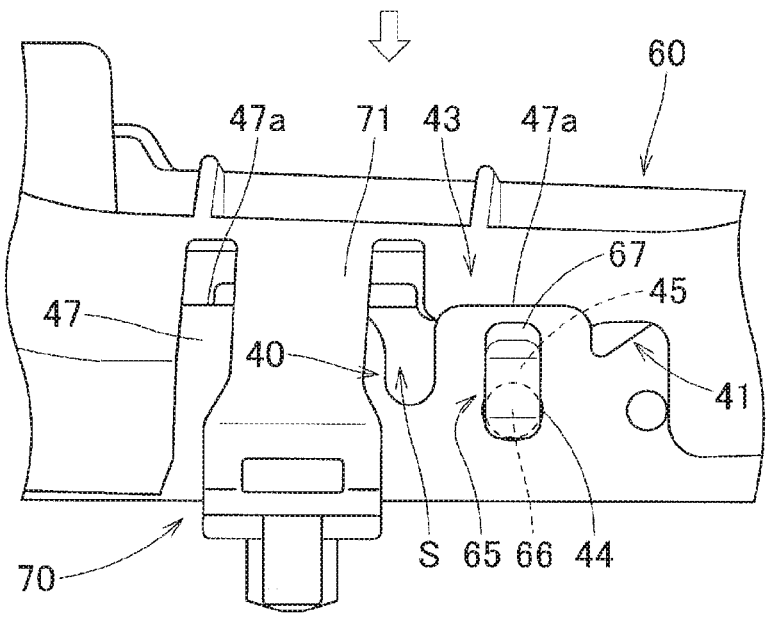

Furthermore, in the head protection airbag device M according to the embodiment, at the upper edge side portion of the airbag 25 (the upper side portion 38 of the peripheral edge section 37), since the tab-shaped portion 43 having the engaging hole 44 into which the engaging protrusion 65 formed on the case 60 is inserted is provided with the recessed sections (the front recessed section 40 and the rear recessed section 41) on both sides thereof in the front-rear direction, the tab-shaped portion 43 is configured so as to be able to be pulled away from the side of the upper edge 26*a* of the airbag 25. Hence, when the folded body 57 is stored in the case 60, the tab-shaped portion 43 can be pulled so as to be raised from the side of the folded body 57, and the engaging protrusion 65 protruding outward on the outer peripheral face side of the case 60 can be easily inserted into the engaging hole 44. Moreover, in the head protection airbag device M according to the embodiment, the upper edge 43*a* of the tab-shaped portion 43 is disposed nearly on the same line as the upper edge 47*a* of the general section 47 of the upper side portion 38 adjacent to the upper edge 43*a.* In other words, as shown in FIG. 14B, the tab-shaped portion 43 is disposed so as not to protrude from the upper edge 47*a* of the general section 47 of the airbag 25 and the engaging hole 44 is disposed below the upper edge 47*a* of the general section 47. Hence, when the folded body 57 is stored inside the case 60 and the engaging protrusion 65 is engaged with the engaging hole 44, the position of the upper edge 47*a* of the general section 47 exposed on the side of the upper face 57*c* of the folded body 57 with respect to the case 60 can be visually recognized easily, and a twisted state in the folded body 57 can also be visually confirmed easily. What's more, since the tab-shaped portion 43 does not protrude from upper edge 47*a* of the general section 47 of the airbag 25, as in the airbag 25 according to the embodiment, the tab-shaped portion 43 can also be disposed without hindrance in the vicinity of the connection port section 51 (in the case of the embodiment, in the vicinity of the rear side of the connection port section 51) disposed so as to protrude upward from the upper edge 26a of the bag body 26, if the folded body 57 is twisted when the folded body 57 is stored inside the case 60, the tab-shaped portion 43 is not disposed at the position corresponding to the engaging protrusion 65, whereby a judgment as to whether the folded body 57 is twisted can be made immediately and the twisted state can be eliminated immediately.

Hence, in the head protection airbag device M according to the embodiment, the folded body 57 can be stored easily in the case body 61, and the twisting of the folded body 57 can be regulated accurately.

Furthermore, in the case body 61 of the head protection airbag device M according to the embodiment, at the portion in the vicinity of the support section 63 from which the engaging protrusion 65 protrudes, the winding hand 70 to be wound around the folded body 57 stored inside the case body 61 is formed so as to extend from the case body 61 while the winding band 70 is disposed adjacent to the support section 63 with the space S provided between the winding band 70 and the support section 63. The winding band 70 is configured such that the side of the tip end 71a of the band body 71 formed so as to extend from the case body 61 is engaged with the side of the case body 61 and such that the winding band 70 holds the folded body 57 stored inside the case body 61 and can release the winding at the time of development and inflation of the airbag 25. Hence, in the head protection airbag device M according to the embodiment, a winding member for holding the folded body 57 stored inside the case body 61 is not required to be disposed separately, whereby the number of components can be reduced. Moreover, since the winding band 70 is disposed in the vicinity of the engaging protrusion 65, the engaging section 73 formed on the side of the tip end 71a of the winding hand 70 can be engaged with the engaged section 80 on the side of the case body 61 at almost the same time when the engaging protrusion 65 is inserted into the engaging hole 44, whereby excellent workability is achieved. in addition, in the head protection airbag device M according to the embodiment, since the folded body 57 is held in the case 60 by the winding band 70 in the vicinity of the engaging protrusion 65 for preventing the twisting of the folded body 57, the folded body 57 can be stored and held inside the case 60 in a more stable state. Furthermore, in the head protection airbag device M according to the embodiment, since the case body 61 is configured such that the space S is provided between the band body 71 of the winding band 70 and the support section 63 from which the engaging protrusion 65 protrudes, the upper edge 47a of the general section 47 exposed on the side of the upper face 57c of the folded body 57 can be visually recognized through the area of the space S (see FIG. 14B), whereby, even if the winding band 70 is provided, the position of the upper edge 47a of the general section 47 of the airbag 25 with respect to the case 60 can be visually recognized easily.

Moreover, in the head protection airbag device M according to the embodiment, the airbag 25 is configured so as to have the bag body 26 and the installing pieces 53 formed so as to protrude upward from the side of the upper edge 26a of the bag body 26, and the installing pieces 53 are configured so as to be separated from the bag body 26 and such that the sides of the base sections 53b thereof are connected to the side of the upper edge 26a of the bag body 26. What's more, in the airbag 25 according to the embodiment, the tab-shaped portion 43 disposed in the vicinity of each installing piece 53 is configured such that the rear recessed section 41 is disposed away from the positioning opening 49 that is used at the time when the installing piece 53 is joined to the bag body 26. Hence, even if the tab-shaped portion 43 is disposed in the vicinity of the installing piece 53 separated from the bag body 26, the side of the base section 53b of the installing piece 53 can be joined easily to the side of the upper edge 26a of the bag body 26 without hindrance, and the tab-shaped portion 43 can also be disposed in the vicinity of the installing piece 53 without hindrance. In the embodiment, although the recessed amount of the rear recessed section 41 formed on the rear side of the tab-shaped portion 43 is made small so that the rear recessed section 41 is located away from the positioning opening 49, the recessed amount of the front recessed section 40 formed on the front side is made large, whereby the tab-shaped portion 43 can be easily pulled up from the folded body 57 and can be easily bent With respect to the folded body 57.

In the head protection airbag device M according to the embodiment, the front recessed section 40 and the rear recessed section 41 disposed in front of and behind the tab-shaped portion 43 are made asymmetrical in the front-rear direction. The shapes of the recessed sections can be changed appropriately depending on the shape of the portion around the engaging protrusion 65 in the case 60, For example, in the embodiment, although the recessed amount of the rear recessed section 41 is set smaller than the recessed amount of the front recessed section 40, the opening width dimension of the rear recessed section 41 is set larger than the opening width dimension of the front recessed section 40. The opening width dimensions and the recessed amounts of the recessed sections can be changed appropriately. For example, in the case that the recessed sections are inclined so as to be smoothly continuous to the upper edge of the general section and that the opening width dimensions are set larger, interference with the upper edge of the case body can be suppressing when the folded body is stored inside the case.

As an airbag 25A, the airbag configured as shown in FIG. 21 can also be used. In this airbag 25A, in addition to the installing pieces 53A and the installing belt (not shown) thereof, the connection port section 51A thereof is separated from the bag body 26A and connected to the bag body 26A, Since the airbag 25A has the same configuration as that of the airbag 25 described above, except that the connection port section 51A is separated, the same members as those of the airbag 25 are designated by attaching "A" at the ends of the reference numerals and signs in the figure and their detailed descriptions are omitted. Also in the airbag 25A, the bag body 264 is formed by hollow weaving.

With this configuration of the airbag 25A, since the upper edge of the tab-shaped portion 43A does not protrude upward from the upper edge of the general section 47A of the bag body 26A, there is no partially protruding portions on the upper edge side of the bag body 26A in which the installing piece 53A and the connection port section 51A are separated from the bag body 26A, whereby the yield in hollow weaving and cutting the bag body 26A can be made excellent. Also in the airbag 25A, as shown in FIG. 21, although the tab-shaped portion 43A is disposed in the vicinity of the installing piece 53BA, like the tab-shaped portion 43 of the airbag 25 described above, the tab-shaped portion 43A is configured such that the rear recessed section 41A is disposed away from the positioning opening 49A that is used at the time when the installing piece 53BA is joined to the bag body 26A. Hence, even if the tab-shaped portion 43A is disposed in the vicinity of the installing piece 53BA separated from the bag body 26A, the base section side of the installing piece 53BA can be joined easily to the upper edge side of the bag body 26A without hindrance, and the tab-shaped portion 43A can also be disposed in the vicinity of the installing piece 53BA without hindrance.

According to an aspect of the present invention, there is provided ahead protection airbag device comprising: an airbag which is formed so as to cover a window of a vehicle at a time of development and inflation and so as to be folded and stored on an upper edge side of the window on a vehicle interior side; and a case which is made of a synthetic resin for storing a folded body of the airbag which is folded so that a lower edge side of the airbag at a time of inflation completion is made close to an upper edge side of the airbag, wherein the airbag has an engaging hole on the upper edge side thereof through which an engaging protrusion formed on a side of the case can pass, the case includes the engaging protrusion disposed so as to protrude outward on an outer peripheral face side of an area that covers an upper face side of the folded body, on the upper edge side of the airbag, a portion constituting a peripheral edge of the engaging hole has recessed sections recessed from an upper edge of the airbag in front of and behind the engaging hole so as to have a tab-shaped portion formed into a tab shape so that the upper edge side can be pulled away from the folded body, and in a state in which the airbag is flatly developed, an upper edge of the tab-shaped portion that has the engaging hole is disposed nearly on a same line as an upper edge of a general section of the airbag which is adjacent to the tab-shaped portion.

In the head protection airbag device according to the present invention, at the upper edge side portion of the airbag, since the tab-shaped portion having the engaging hole into which the engaging protrusion formed on the case is inserted is provided with the recessed sections on both sides thereof in the front-rear direction, the tab-shaped portion is configured so as to be able to be pulled away from the upper edge side of the airbag. Hence, when the folded body is stored in the case, the tab-shaped portion can be pulled so as to be raised from the side of the folded body, and the engaging protrusion protruding outward on the outer peripheral face side of the case can be easily inserted into the engaging hole. Moreover, in the head protection airbag device according to the present invention, the upper edge of the tab-shaped portion is disposed nearly on the same line as the upper edge of the general section of the airbag which is adjacent to the tab-shaped portion. In other words, the tab-shaped portion is disposed so as not to protrude from the upper edge of the general section of the airbag and the engaging hole is disposed below the upper edge of the general section. Hence, when the folded body is stored inside the case and the engaging protrusion is engaged with the engaging hole, the position of the upper edge of the general section of the airbag exposed on the side of the upper face of the folded body with respect to the case can be visually recognized easily, and a twisted state in the folded body can also be visually confirmed easily. What's more, since the tab-shaped portion does not protrude from upper edge of the general section of the airbag, for example, in the case that the connection port section connected to the inflator is disposed so as to protrude from the upper edge of the airbag, the tab-shaped portion can also be disposed without hindrance in the vicinity of the connection port section. If the folded body is twisted when the folded body is stored inside the case, the tab-shaped portion is not disposed at the position corresponding to the engaging protrusion, whereby a judgment as to whether the folded body is twisted can be made immediately and the twisted state can be eliminated immediately.

Hence, in the head protection airbag device according to the present invention, the folded body can be stored easily in the case, and the twisting of the folded body can be regulated accurately.

Furthermore, in the head protection airbag device, it is preferable that the case includes: a case body which stores the folded body; and a winding band which is formed at a portion of the case body in a vicinity of a support section from which the engaging protrusion protrudes, which extends from the case body so as to be adjacent to the support section with a space therebetween and which is wound around the folded body stored in the case body, and a tip end side of the winding band is engaged with a side of the case body, the winding band holds the folded body stored inside the case body and the winding band can release winding at the time of development and inflation of the airbag.

With the above-mentioned configuration of the head protection airbag device, a winding member for holding the folded body stored inside the case body is not required to be disposed separately, whereby the number of components can be reduced. Moreover, since the winding band is disposed in the vicinity of the engaging protrusion, the tip end side of the winding band can be engaged with the case body side at almost the same time when the engaging protrusion is inserted into the engaging hole, whereby excellent workability is achieved. In addition, in the head protection airbag device configured as described above, since the folded body is held in the case by the winding band in the vicinity of the engaging protrusion for preventing the twisting of the folded body, the folded body can be stored and held inside the case in a more stable state. Furthermore, in the head protection airbag device configured as described above, since the case body is configured such that the winding band is disposed adjacent to the support section from which the engaging protrusion protrudes with a space provided between the winding band and the support section, the upper edge of the general section of the airbag can be visually recognized through the area of the space, whereby, even if the winding band is provided, the position of the upper edge of the general section of the airbag with respect to the case can be visually recognized easily.

Moreover, in the head protection airbag device configured as described above, it is preferable that the airbag includes: a band body which covers the vehicle interior side of the window at the time of inflation completion; and an installing piece which is formed so as to protrude upward from an upper edge side of the bag body and which is installed on the upper edge side of the window, the installing piece is separated from the bag body and a base section side thereof is joined to the upper edge side of the bag body, and the tab-shaped portion is configured such that the recessed sections are disposed away from a positioning opening that is used at a time when the installing piece is joined to the bag body, in a vicinity of the installing piece.

With the head protection airbag device configured as described above, even if the tab-shaped portion is disposed in the vicinity of the installing piece separated from the bag body, the base section side of the installing piece can be joined to the upper edge side of the bag body without hindrance, and the tab-shaped portion can also be disposed in the vicinity of the installing piece.

What's more, in the head protection airbag device configured as described above, it is preferable that the airbag includes: a bag body which covers the vehicle interior side of the window at the time of inflation completion; an installing piece which is formed so as to protrude upward from an upper edge side of the bag body and which is installed on the upper edge side of the window; and a connection port section which protrudes upward from an upper edge of the bag body and which is connected to an inflator, the installing piece and the connection port section are separated from the bag body, and the bag body is formed by hollow weaving.

With the head protection airbag device configured as described above, since the upper edge of the tab-shaped portion does not protrude upward from the upper edge of the general section of the bag body, there is no partially protruding portions on the upper edge side of the bag body, whereby the yield in hollow weaving and cutting the bag body can be made excellent.

Furthermore, in the head protection airbag device configured as described above, it is preferable that the tab-shaped portion is configured such that the recessed sections are disposed away from a positioning opening that is used at a time when the installing piece is joined to the bag body, in a vicinity of the installing piece.

Still further, in the head protection airbag device configured as described above, wherein shapes of the recessed sections disposed in front of and behind the tab-shaped portion are asymmetrical in a front-rear direction.

What is claimed is:

1. A head protection airbag device comprising:
    an airbag which is formed so as to cover a window of a vehicle at a time of development and inflation and so as to be folded and stored on an upper edge side of the window on a vehicle interior side; and
    a case which is made of a synthetic resin for storing a folded body of the airbag which is folded so that a lower edge side of the airbag at a time of inflation completion is made close to an upper edge side of the airbag, wherein
    the airbag has an engaging hole on the upper edge side thereof through which an engaging protrusion formed on a side of the case can pass,
    the case includes the engaging protrusion disposed so as to protrude outward on an outer peripheral face side of an area that covers an upper face side of the folded body,
    on the upper edge side of the airbag, a portion constituting a peripheral edge of the engaging hole has recessed sections recessed from an upper edge of the airbag in front of and behind the engaging hole so as to have a tab-shaped portion formed into a tab shape so that the upper edge side can be pulled away from the folded body, and
    in a state in which the airbag is flatly developed, an upper edge of the tab-shaped portion that has the engaging hole is disposed nearly on a same line as an upper edge of a general section of the airbag which is adjacent to the tab-shaped portion.

2. The head protection airbag device according to claim 1, wherein
    the case includes:
    a case body which stores the folded body; and
    a winding band which is formed at a portion of the case body in a vicinity of a support section from which the engaging protrusion protrudes, which extends from the case body so as to be adjacent to the support section with a space therebetween and which is wound around the folded body stored in the case body, and
    a tip end side of the winding band is engaged with a side of the case body, the winding band holds the folded body stored inside the case body and the winding band can release winding at the time of development and inflation of the airbag.

3. The head protection airbag device according to claim 1, wherein
    the airbag includes:
    a band body which covers the vehicle interior side of the window at the time of inflation completion; and
    an installing piece which is formed so as to protrude upward from an upper edge side of the bag body and which is installed on the upper edge side of the window,
    the installing piece is separated from the bag body and a base section side thereof is joined to the upper edge side of the bag body, and
    the tab-shaped portion is configured such that the recessed sections are disposed away from a positioning opening that is used at a time when the installing piece is joined to the bag body, in a vicinity of the installing piece.

4. The head protection airbag device according to claim 1, wherein
    the airbag includes:
    a bag body which covers the vehicle interior side of the window at the time of inflation completion;
    an installing piece which is formed so as to protrude upward from an upper edge side of the bag body and which is installed on the upper edge side of the window; and
    a connection port section which protrudes upward from an upper edge of the bag body and which is connected to an inflator,
    the installing piece and the connection port section are separated from the bag body, and
    the bag body is formed by hollow weaving.

5. The head protection airbag device according to claim 4, wherein
    the tab-shaped portion is configured such that the recessed sections are disposed away from a positioning opening that is used at a time when the installing piece is joined to the bag body, in a vicinity of the installing piece.

6. The head protection airbag device according to claim 1, wherein
    shapes of the recessed sections disposed in front of and behind the tab-shaped portion are asymmetrical in a front-rear direction.

* * * * *